United States Patent
Olson

(10) Patent No.: US 11,184,156 B2
(45) Date of Patent: Nov. 23, 2021

(54) IMPACT DATA MANAGER FOR DYNAMIC DATA DELIVERY

(71) Applicant: AON GLOBAL OPERATIONS SE, SINGAPORE BRANCH, Singapore (SG)

(72) Inventor: Douglas A. Olson, Rosemount, MN (US)

(73) Assignee: AON GLOBAL OPERATIONS SE, SINGAPORE BRANCH, Singapore (SG)

( * ) Notice: Subject to any disclaimer, the term of this patent is extended or adjusted under 35 U.S.C. 154(b) by 1371 days.

(21) Appl. No.: 15/342,951

(22) Filed: Nov. 3, 2016

(65) Prior Publication Data
US 2017/0078094 A1    Mar. 16, 2017

Related U.S. Application Data

(63) Continuation-in-part of application No. 13/493,095, filed on Jun. 11, 2012, now Pat. No. 9,489,397.

(60) Provisional application No. 61/512,390, filed on Jul. 27, 2011.

(51) Int. Cl.
| | |
|---|---|
| *G06F 16/00* | (2019.01) |
| *H04L 9/08* | (2006.01) |
| *H04L 29/06* | (2006.01) |
| *G06F 16/29* | (2019.01) |

(52) U.S. Cl.
CPC ............ *H04L 9/0825* (2013.01); *G06F 16/29* (2019.01); *H04L 63/0442* (2013.01); *H04L 63/08* (2013.01)

(58) Field of Classification Search
CPC ..... G06F 16/29; H04L 63/0442; H04L 63/08; H04L 9/0825
See application file for complete search history.

(56) References Cited

U.S. PATENT DOCUMENTS

| | | | |
|---|---|---|---|
| 7,444,506 B1 * | 10/2008 | Datta .................. | H04L 63/0428 370/238 |
| 8,554,932 B1 | 10/2013 | Leong et al. | |
| 9,489,397 B1 | 11/2016 | Olson | |

(Continued)

OTHER PUBLICATIONS

International Search Report and Written Opinion of the International Searching Authority for International Application No. PCT/2017/059906, dated Feb. 28, 2018.

(Continued)

*Primary Examiner* — Dinku W Gebresenbet
(74) *Attorney, Agent, or Firm* — Gardella Grace P.A.

(57) ABSTRACT

In a preferred embodiment, a system for securely delivering source data to a destination system over a network includes a data manager system operatively connected to the network, where the data manager system includes circuitry configured to receive a public key from the destination system, generate a random session key, encrypt the session key with the public key using a public key cryptosystem, divide the source data into a number of chunks, compress each of the chunks, merge all of the compressed chunks into an assembled file, encrypt the assembled file with the session key using a symmetric-key cryptosystem, divide the encrypted assembled file into a number of parts, send each of the parts to the destination system over the network, and send the encrypted session key to the destination system over the network.

17 Claims, 25 Drawing Sheets

(56) References Cited

U.S. PATENT DOCUMENTS

| | | |
|---|---|---|
| 2003/0149657 A1 | 8/2003 | Reynolds et al. |
| 2007/0192470 A1* | 8/2007 | Fujiwara ................. H04L 67/06 709/223 |
| 2007/0214023 A1 | 9/2007 | Mathai et al. |
| 2007/0276951 A1 | 11/2007 | Riggs et al. |
| 2008/0133300 A1 | 6/2008 | Jalinous |
| 2010/0030586 A1* | 2/2010 | Taylor .................... G06Q 40/08 705/4 |
| 2010/0280755 A1 | 11/2010 | Pillsbury et al. |
| 2011/0071980 A1* | 3/2011 | Patterson .............. G06F 3/0611 707/626 |
| 2012/0066517 A1* | 3/2012 | Vysogorets ......... G06F 21/6209 713/193 |
| 2012/0089829 A1* | 4/2012 | Kholidy ................. H04L 67/10 713/153 |
| 2012/0123806 A1 | 5/2012 | Schumann et al. |
| 2014/0019171 A1 | 1/2014 | Koziol |
| 2016/0154698 A1 | 6/2016 | Kazi |
| 2016/0173458 A9 | 6/2016 | Alculumbre |
| 2016/0283127 A1 | 9/2016 | Stabrawa et al. |
| 2016/0306699 A1 | 10/2016 | Resch et al. |

OTHER PUBLICATIONS

Non-Final Office Action dated Oct. 2, 2014 for U.S. Appl. No. 13/493,095.
Final Office Action dated Apr. 9, 2015 for U.S. Appl. No. 13/493,095.
Non-Final Office Action dated Oct. 26, 2015 for U.S. Appl. No. 13/493,095.
Notice of Allowance dated Jul. 6, 2016 for U.S. Appl. No. 13/493,095.
International Preliminary Report on Patentability of PCT/US2017/059906 dated May 7, 2019.
Partial Supplementary European Search Report dated Apr. 14, 2020 from European Application No. 17867267.1.
Extended European Search Report issued in EP Application No. 17867267.1 dated Jul. 15, 2020.

* cited by examiner

| # | Client Column Name | Server Column Name | Server Column Type |
|---|---|---|---|
| 2 | NumLocsInPolicy | NumLocsInPolicy | int |
| 3 | AttachPoint | AttachPoint | int |
| 4 | PolicyPremium | PolicyPremium | int |
| 5 | PolicyDeductible | PolicyDeductible | datetime |
| 6 | LocationLimit | LocationLimit | decimal |
| 7 | Construction | Construction | float |
| 8 | LOB | LOB | int |
| 9 | Address | Address | money |
| 10 | CITY | CITY | nvarchar |
| 11 | COUNTY | COUNTY | nvarchar |

Portfolio columns: 362a (Client Column Name), 362b (Server Column Name), 362c (Server Column Type), 358, 390

FIG. 2J

Impact Data Manager

372

☐ New ☐ Open ▾ ☐ Save ▾ ☐ Save As ▾ ☐ Explorer | ⊕ Add Column ☐ Edit Custom Column ⊗ Delete Column

Source - Destination Mapping

Portfolio columns: 362a  362b  362c

| # | Client Column Name | Server Column Name | Server Column Type |
|---|---|---|---|
| 9 | Address | Address | nvarchar |
| 10 | CITY | CITY | nvarchar |
| 11 | COUNTY | COUNTY | nvarchar |
| 12 | STATE | STATE | nvarchar |
| 13 | POSTALCODE | POSTALCODE | nvarchar |
| 14 | ADDRMATCH | ADDRMATCH | int |
| 15 | AddrMatchDesc | AddrMatchDesc | nvarchar |
| 16 | latitudet | latitudet | decimal |
| 17 | longitude | longitude | decimal |
| 18 | ALL | ALL | money |

Properties:

Field Properties

| Size | 18,12 |
|---|---|
| Format | |
| Min value | -180 |
| Max value | 180 |
| Default value | |
| Allow nulls | ☑ |

Validation

Rule: Latitude, Longitude required     [Validate]

Mapping is correct!

392

375

[<< Back] [Next >>]

```
Portfolio Management - Impact Data Manager: New Portfolio Wizard        □ X

Impact Data Manager

┌─ Portfolio Information ─────────────────────────────────────────┐
│  Portfolio name:  [Test201108                              ]    │
│           Date:   [8/25/2011    ▼]                              │
│  Date description:[August Sample                           ]    │
│  Date source:    [D:\Profiles\sanderson\Desktop\Test\EVoDSampleUSLargeDataSet.txt]│
│           ☑ Overwrite portfolio on server if exists             │
└─────────────────────────────────────────────────────────────────┘
┌─ Peril ──────────────────┐  ┌─ Control Totals ──────────────────┐
│ [EQ (EQ)          ▼]     │  │ ☑ Verify Control Totals           │
│                          │  │ Group by field: [PolicyNumber   ▼]│
│                          │  │ Summary field:  [PolicyDeductible▼]│
└──────────────────────────┘  └───────────────────────────────────┘

[ << Back ] [ Next >> ]
```

- 402: Portfolio Information
- 405: Date
- 408: Date description
- 410: Date source
- 412: (Overwrite checkbox area)
- 415: Peril
- 418: Control Totals
- 420: Next >>

Source - Destination Mapping

Portfolio columns: 702

| # | Client Column Name | Server Column Name 704 | Server Column Type 706 |
|---|---|---|---|
| 1 | PolicyNumber | PolicyNumber | nvarchar |
| 2 | NumLocsInPolicy | NumLocsInPolicy | int |
| 3 | AttachPoint | AttachPoint | int |
| 4 | PolicyPremium | PolicyPremium | int |
| 5 | PolicyDeductible | PolicyDeductible | int |
| 6 | LocationInt | LocationInt | int |
| 7 | Construction | Construction | nvarchar |
| 8 | LOB | LOB | nvarchar |
| 9 | Address | Address | nvarchar |
| 10 | CITY | CITY | nvarchar |

Properties: 708

Column Properties

- Size
- Format
- Min value
- Max value
- Default value
- Allow nulls

| # | Client Column Name | Server Column Name | Server Column Type |
|---|---|---|---|
| 11 | COUNTY | COUNTY | nvarchar |
| 12 | STATE | STATE | nvarchar |
| 13 | POSTALCODE | POSTALCODE | nvarchar |
| 14 | ADDRMATCH | ADDRMATCH | int |
| 15 | AddrMatchDesc | AddrMatchDesc | nvarchar |
| 16 | latitude | latitude | decimal |
| 17 | longitude | longitude | decimal |
| 18 | AAL | AAL | money |
| 19 | BookID | BookID | int |
| 722 | MyColumn | MyCustomColumn | int |

FIG. 7B

IMPACT DATA MANAGER FOR DYNAMIC DATA DELIVERY

CROSS-REFERENCES TO RELATED APPLICATIONS

The present application is a continuation in part of and claims the benefit of Ser. No. 13/493,095 filed Jun. 11, 2012 and entitled "Impact Data Manager for Dynamic Data Delivery", which claims the benefit of U.S. Provisional Application No. 61/512,390 filed on Jul. 27, 2011, the entire disclosure of each of which is hereby incorporated by reference.

BACKGROUND

Insurance providers generally monitor and track risk events such as hurricanes, earthquakes, tornadoes, wildfires, riots, unrest, hail events, volcanic eruptions, etc. that impact their products (e.g., insurance policies). A system of monitoring events that affect the state of a set of insurance policies may include an application that provides mapping of risk event related data based on information collected from multiple sources. Thus, for example, where a tornado is occurring or has occurred, data on the tornado event may be mapped to a geographic area. In this manner, an insurance provider or other interested party may be able to visualize and gauge its risk exposure via a map. Such a system may be called a mapping system or an impact-on-demand system.

A data collection and data management component may be implemented to manage data upon which the impact-on-demand system operates. For example, a worthwhile feature of such an event/risk mapping system may be the ability to accumulate and incorporate new data relating to the event from multiple sources in an efficient manner to enable basic mapping features such as on-demand report generation. However, managing the received data from multiple disparate sources having different formats can be difficult. Moreover, creating certain views based on dynamic data acquisition may require ad-hoc or on-the-fly re-organization of data. Further, in a system in which available data combinations are changing, an efficient process may be needed to recognize when certain fields or combinations of fields are available so that further data manipulation can be more efficient.

SUMMARY OF ILLUSTRATIVE EMBODIMENTS

Embodiments of a system for delivering source data to a destination system (an impact-on-demand or mapping system) include a dynamic data delivery module stored on a non-transitory, tangible computer storage medium, a link that communicatively connects the dynamic data delivery module to the mapping system, and a data storage entity storing one or more rules corresponding to the mapping system. The dynamic data delivery module may be configured to automatically transform the source data from a first format into a second format, where the second format is compatible with the mapping system. The dynamic data delivery module may be further configured to perform a validation of at least a portion of the source data based on at least one of the rules corresponding to the mapping system, and to cause the transformed, validated source data to be delivered, via the link, to the mapping system to be stored in a client portfolio. The mapping system may be configured to receive the transformed, validated source data from the dynamic data delivery module, store the data in a client portfolio, and geographically map contents of the client portfolio and impact events to determine risk exposure.

Embodiments of a method of delivering source data to an impact-on-demand or mapping system include receiving, from the mapping system, one or more rules corresponding to one or more client portfolios stored at the mapping system. The method may also include automatically transforming, based on at least one of the rules, client-indicated source data from a first format into a second format. The method may additionally include performing a validation of at least a portion of the source data in the first format or in the second format, and causing the transformed, validated source data to be delivered to the mapping system for mapping with one or more impact events for risk exposure analysis or for other mapping system functionality. Outputs of the mapping system that are based on the transformed, validated source data may be displayed at a local or remote user interface in real-time.

Embodiments of a system for delivering source data to an impact-on-demand or mapping system may include a dynamic data delivery module. The dynamic data delivery module may have a first communicative connection to a user interface and a second communicative connection to the impact-on-demand or mapping system. The mapping system may be configured to receive the source data from the dynamic data delivery module and to geographically map contents of the source data and impact events to determine risk exposure. The dynamic data delivery module may be configured to be executed by a processor to receive an indication of a user selection of source data in a first format, transform the source data in the first format into a second format compatible with the mapping system, and perform a validation of at least a portion of the source data in the first format or in the second format. The dynamic data delivery module may further be configured to cause the transformed, validated source data to be delivered to the mapping system to be stored in a client portfolio. The mapping system may perform mapping functionality on the source data and one or more impact events, and may return an output to the dynamic data delivery module for display on the user interface, in an embodiment. When the output is generated per a user request, the output may be generated by the mapping system and returned to the dynamic data delivery module in real-time.

Embodiments of a system for securely delivering source data to a destination system over a network include, a data manager system operatively connected to the network, where the data manager system includes circuitry configured to receive a public key from the destination system, generate a random session key, encrypt the session key with the public key using a public key cryptosystem, divide the source data into a number of chunks, compress each of the chunks, merge all of the compressed chunks into an assembled file, encrypt the assembled file with the session key using a symmetric-key cryptosystem, divide the encrypted assembled file into a number of parts, send each of the parts to the destination system over the network, and send the encrypted session key to the destination system over the network.

BRIEF DESCRIPTION OF THE DRAWINGS

FIGS. 2A-2L include example screen shots illustrating a set of example interactions between a user and a front end of the mapping or impact-on-demand system to deliver source data to a back end of the mapping or impact-on-demand system;

FIGS. 7A and 7B include example screen shots illustrating mapping data types for mapping contents of source data;

DETAILED DESCRIPTION OF ILLUSTRATIVE EMBODIMENTS

Figure 1:
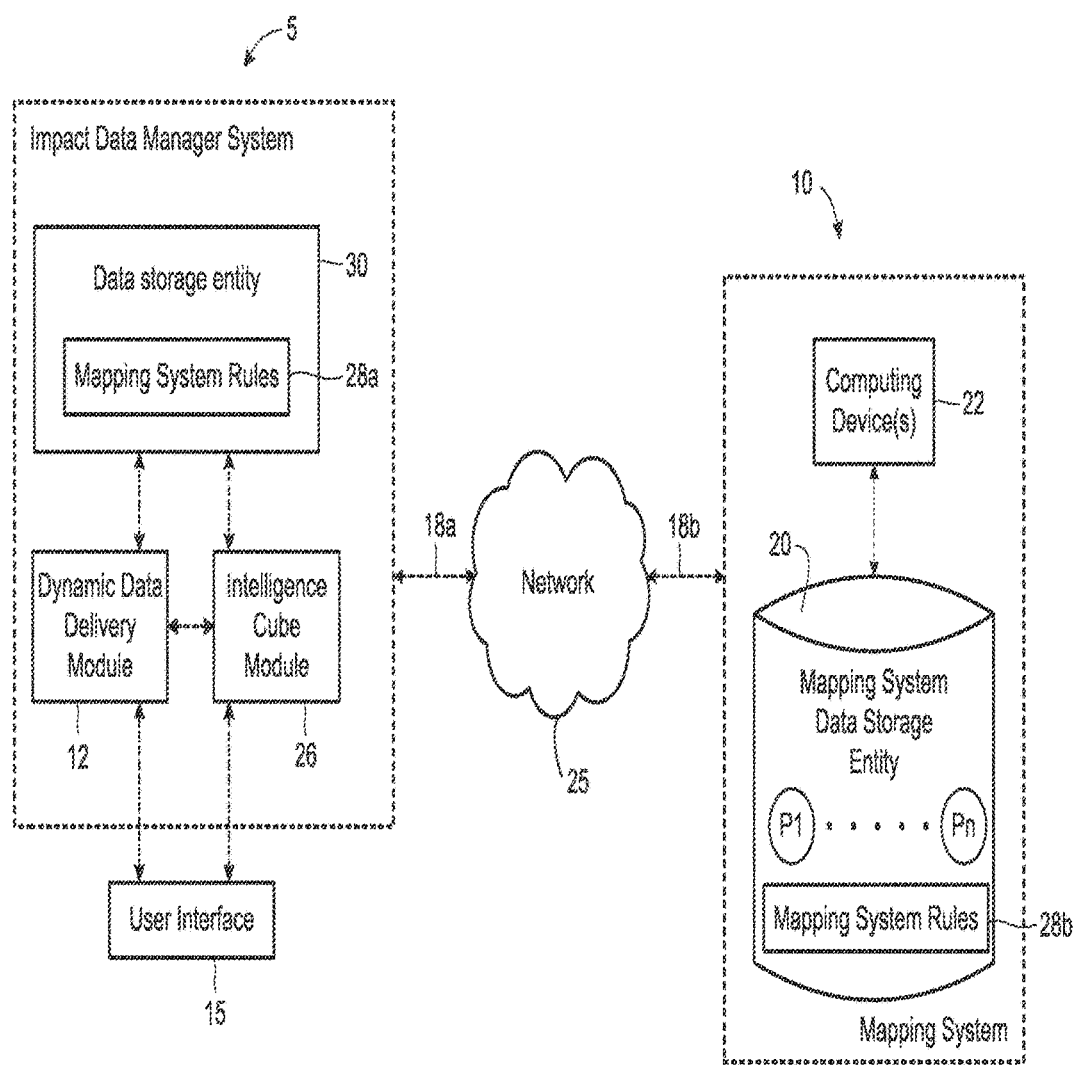
FIG. 1 is a block diagram of an example system for delivering source data to a mapping or impact-on-demand system, such as for storage in a portfolio at the mapping or impact-on-demand system.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

An impact-on-demand system (also referred to interchangeably herein as a "mapping system," an "exposure system," or a "risk management system") generally maps parameters of an impact event to a particular location or geographical area and provides an indication of risk exposure for the particular location or geographical area. Typically, but not necessarily, the risk exposure may be indicated using a map, a chart, a report or other suitable indication. An "impact event" may be any catastrophic event. For example, an impact event may be a weather-related event such as a storm, hurricane, earthquake, tornado, hail storm, volcanic eruption, etc. An impact event may be a natural or man-made disaster such as a wildfire or a flood caused by a dam break. In some situations, an impact event may be societal in nature, such as a riot, terrorism act, or civil unrest. Generally, an impact event may be any risk event that has an ability to impact or affect a physical or geographical area, and, as such, may have an ability to impact or affect real property and/or other insurable or insured properties of interest situated in or around the physical or geographical area.

A client, user or other interested party of the impact-on-demand or mapping system may create or define one or more client portfolios that indicate specific physical or geographical areas of particular interest to the client. In some instances, client portfolios may include indications of real property or other insurable or insured properties of interest to the client where the property is located in, on or by the specific physical or geographical areas (e.g., buildings, factories, farm land, waterways, forests, or other tangible fixed or natural capital). The impact-on-demand or mapping system may provide, as at least a portion of its output, an indication of existing and/or predicted risk to one or more client portfolios as related to one or more impact events. In an example, the impact-on-demand or mapping system may provide a visual map that tracks the impact event over time with respect to a particular client portfolio, and/or the impact-on-demand or mapping system may provide on-demand reports corresponding to the impact event and the client portfolio. Reports may include, for example, predicted or estimated loss, damage, replacement costs, and the like. In some embodiments, output of the impact-on-demand system may be provided to the user on request. In some embodiments, upon user request, the output of the impact-on-demand system may be provided to the user in real-time.

As such, a client, user or other interested party may utilize the impact-on-demand or mapping system to better assess the risk of the one or more impact events for risk management or other purposes. The terms "client," "user" and "interested party" of the impact-on-demand or mapping system are used interchangeably herein to refer to a receiver of information (e.g., maps, reports, and other information) that is provided by the impact-on-demand or mapping system. The client may be a computing device, or the client may be a human user of a computing device. In some scenarios, a human client (or the company or organization with which the human client is associated) may have a business relationship with the provider of the impact-on-demand or mapping system, although this is not necessary. In one non-limiting example, a client may be a primary insurance company or a department of an insurance company such as management, product management group, claims department, underwriting department, etc. In another example, the client may be a government disaster or emergency response organization. Other examples of clients that have business or working relationships with the provider of the impact-on-demand system may be possible.

The techniques described herein include systems and methods of managing, organizing and delivering source data from a client to enable the impact-on-demand system to generate various different risk mapping functionalities and efficiencies. In an embodiment, the source data may be delivered from a client for inclusion in a client portfolio that is stored at the impact-on-demand or mapping system. The term "source data," as used herein, generally refers to data of interest to the client that is provided to the mapping or impact-on-demand system for generating its output, e.g., maps, reports, risk management assessments, and the like. For example, the source data may include data pertaining to real property or other insurable or insured properties of interest to the client that are located in, on or by the specific physical or geographical areas (e.g., buildings, factories, farm land, waterways, forests, or other tangible fixed or natural capital). Typically, but not necessarily, the source data may include an indication of a geographical location corresponding to the property of interest to the client.

The source data for delivery to the impact-on-demand system may be indicated by the client, and may be obtained from a data file. Alternatively or additionally, the source data may be provided by the client via direct input. In some scenarios, at least some of the source data may include data that is provided by a party other than the client (such as a database or file that is generated by a third-party). In some scenarios, at least a portion of the source data may include existing client portfolio data (e.g., data that has been previously incorporated into a client portfolio), such as when the client desires to modify existing client portfolio data. The source data may be entered or provided by a client of the impact-on-demand or mapping system at an impact data manager (also referred to herein interchangeably as an "impact data manager system").

Generally, the techniques described herein may be implemented by an impact data manager in communicative connection with the impact-on-demand or mapping system. As such, the impact data manager may be considered to be a "front-end component," and the mapping system may be considered to be a "back-end component." In some embodiments, more than one impact data manager may be in communicative connection with the impact-on-demand or mapping system, such as in scenarios where multiple clients use the impact-on-demand system and each impact data manager services a different client.

FIG. 1 illustrates a block diagram of an example impact data manager 5 front-end in communicative connection with an impact-on-demand or mapping system 10 back-end. The impact data manager 5 may be configured to dynamically deliver source data to the impact-on-demand or system mapping 10. An example mapping or impact-on-demand system including front and back ends may be the ImpactOnDemand® platform developed by Aon Benfield, Inc. The ImpactOnDemand platform includes an ImpactManager, which is one of many possible examples of an impact data manager 5 front-end.

In some embodiments, the impact data manager 5 may include a dynamic data delivery module 12 that is accessible to a user via a user interface 15, and that is configured to dynamically deliver source data to the mapping system 10. In an embodiment, the system 5 may reside on one or more computing devices whose user interface 15 is directly utilized by a user (e.g., via a keyboard, mouse, screen, voice commands, etc.).

In another embodiment, the impact data manager system 5 may be remotely situated from the user and may reside on one or more remote computing devices, servers, cloud computing devices, etc. In this embodiment, the system 5 may be accessible to the user via a user interface 15 of a device that is directly and locally accessible to the user (e.g., a laptop, desktop, wireless device, smart device, etc.) and that is in communicative connection with the system 5.

In some embodiments, the user interface 15 may be provided by via a rich client (e.g., an executable program) that communicates through a network (not shown) with the impact data manager system 5. The rich client, in some embodiments, is an application executable by an Internet browser application. In some examples, the rich client may be a runtime executable application or applet configured to coordinate transfer of information between the client computing system and the impact data manager system 5 via an Internet browser application. In another example, the rich client may be an installed application configured to present a user interface to a user for coordinating transfer of information between the client computing system and the impact data manager system 5.

The rich client, in some embodiments, enforces security rules. In a first example, the rich client may be configured to coordinate authentication with a user account with the impact data manager system 5. In another example, the rich client may be configured to confirm that a user having a user account with the impact data manager system 5 has authorization to upload data to the impact data manager system 5. In a particular example, certain users may have a user level associated with viewing information provided by the impact data manager system 5 but not for uploading data to the data manager system 5 for analysis and generation of the information.

In some embodiments, the rich client enforces secure data transfer rules and/or processes for transmission of data to the impact data manager system 5. For example, the rich client may set secure transmission settings of the Internet browser application. In another example, the rich client may follow a security process or protocol design to affect secure transfer. The security process or protocol may involve coordinated encryption of the information, where encryption keys are shared between the rich client and the impact data manager system 5. The security process or protocol, for example, may include the process 500 described in relation to FIG. 4. The network between the user interface 15 and the impact data manager system 5 may be a private network, a public network (e.g., the Internet), or some combination of public and private networks.

In some embodiments, the rich client provides an interactive display for identifying data formatting within a source data file. In one illustration, the rich client may allow the user to select a third party driver to translate data stored in an unrecognized format. For example, the user may be provided the opportunity to browse to and select driver to translate from a particular database file type (e.g., Informix RDBMS by IBM Corporation of Armonk, N.Y. or Oracle RDBMS by Oracle Corporation of Santa Clara, Calif.). Format identification, for example, may be entered via a user interface similar to the screen 314 shown in FIG. 2B. For example, the "advanced" user control 318g may correspond to selection of a driver to translate information provided in any data format that is supported by the client system. Further, the rich client may allow the user to identify a delimiter used in the selected data file. For example, as illustrated in FIG. 2E, the rich data client may provide an interactive display for selecting or entering an appropriate data delimiter.

In another example, the rich client may automatically identify data types captured in rows of a data file, present the automatically detected data types to the user, and allow the user to correct an inaccurate data type (e.g., an integer should be identified as long integer).

In some embodiments, the rich client may allow the user to select particular columns of a data file for transmission to the impact data manager system 5. For example, certain columns within an internal data file may include sensitive data (e.g., account numbers, social security numbers, etc.) not useful to the impact data manager system 5. The user may be provided the opportunity to deselect one or more data columns for transmission to protect this sensitive data. For example, as illustrated in FIG. 2F, the user may be presented with a list of selectable/deselectable columns for importing a portion of the data file to the impact data manager system 5.

In some implementations, the rich client may provide the user with the opportunity to store the data formatting for future identification. For example, the rich client may upload the data format information to the impact data manager system 5 for storage in user account information. Upon a subsequent upload by the user, the user may select a data file and the stored data formatting. The rich client may retrieve the data formatting from the impact data manager system 5 and validate that the contents of the file match the stored data formatting (e.g., same number of columns, columns identified as numbers don't contain strings, etc.). The data formatting, in some embodiments, includes instruction to deselect certain column(s) prior to transmission. Turning to FIG. 7, an example data type mapping 700 illustrates a client column name 702 pertaining to a data column of the local client data file, a server column name 704 referencing a name to use for that data column on the impact data manager system 5, and a server column type 706 pertaining to a data type for storage at the impact data manager system 5. Further, in some embodiments, the user can set one or more column properties 708 for each column, such as a default value in the event that a field is blank or additional rules regarding size, formatting and/or minimum and maximum allowable values. The destination mapping, upon completion, may be uploaded to the impact data manager system 5, for example, for later use by the client.

In some embodiments, the rich client provides the user with an interactive interface for combining contents of two or more columns into a single data column (e.g., new data type). In a particular example, the user may select to combine a street address column, a city column, a state column, and a zip code column as a single address data type. The interactive interface, in a further example, may allow the user to enter formatting details for formatting the combined information. For example, when combining fields to obtain a street address, the user may enter that a comma should be placed after the city name and two spaces placed between the state name and the zip code.

Figure 8A:
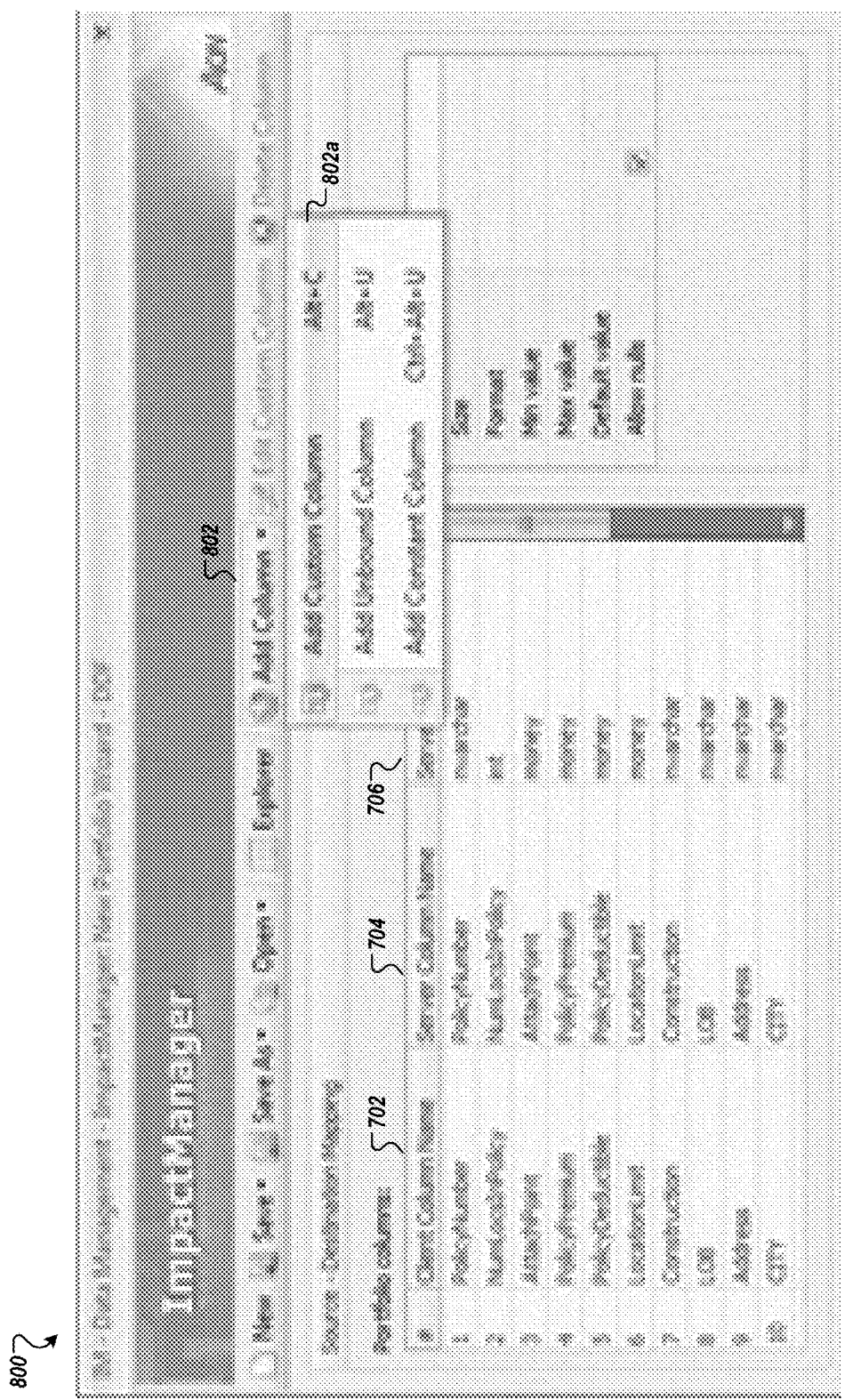
FIGS. 8A-8C include example screen shots illustrating a set of example user interactions for combining source data columns into new columns of source data.
Figure 8B:
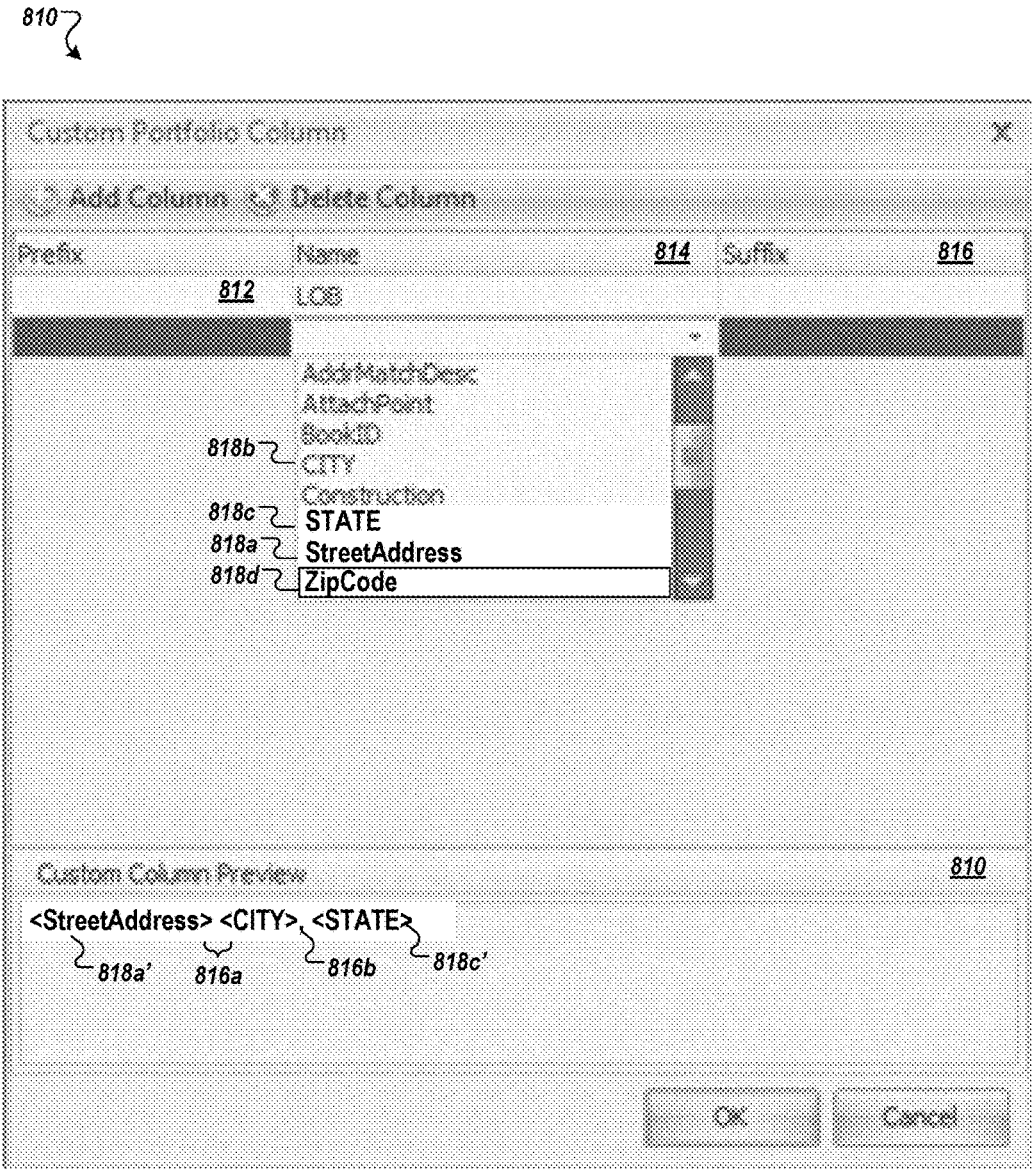
Figure 8C:
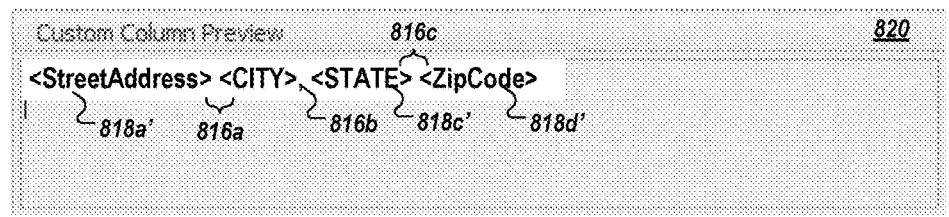

Turning to FIG. 8A, in some implementations, a graphical user interface 800 includes an "add columns" menu selection with an "add custom column" option 802a. Upon selection of the "add custom column" option 802a, turning to FIG. 8B, a custom portfolio column graphical user interface 810 provides the user with an interactive tool for creating a new column based upon a number of existing columns. As illustrated, the user can select a prefix 812, a column name 814, and/or a suffix 816 for building the custom column. In operation, for example, the user may select a street address column 818a, along with a suffix 816a of a single white space, then a city column 818b with a suffix of a comma and white space 816b, and finally a state column 818c. Further, turning to FIG. 8C, the user may select the currently highlighted zip code column 818d to follow a suffix 816c portion of the state column selection.

Upon completion of the custom column, in some implementations, the user stores the custom column to the destination mapping. For example, as illustrated in FIG. 7B, a destination mapping 720 is updated with row 722 having a client column name 702 of "MyColumn", a server column name 704 of "MyCustomColumn", and a server column type 706 of nvarchar (e.g., variable length alphanumeric entry).

As illustrated in FIG. 1, the dynamic data delivery module 12 of the impact data manager system 5 may be communicatively connected to the impact-on-demand or mapping system 10 by one or more links 18a, 18b. FIG. 1 illustrates the impact data manager system 5 and the mapping system 10 as being communicatively connected by the links 18a, 18b through a network 25. The network 25 may be, for example, a private network, a public network (e.g., the Internet), or some combination of public and private networks. In some embodiments, though, the impact data manager system 5 and the mapping system 10 need not be communicatively connected through any network, and instead may be locally connected, e.g., when the impact data manager system 5 and the mapping system 10 reside on a same bank of servers or computing devices.

The mapping system 10 back-end may include a mapping system data storage entity 20 that is accessible to one or more computing devices 22. The mapping system data storage entity 20 may store one or more client portfolios P1-Pn. Each of the client portfolios may indicate a set of properties or geographical locations that are of interest to a client for mapping purposes. For example, a client portfolio may indicate a set of insured real properties in a specific geographical area. In an embodiment, a client portfolio may include any data that may be visualized on a map including, but not limited to data corresponding to weather patterns, terror targets, offshore oil platforms, sinkhole locations, fire stations, migrations of crowds of people (e.g., during rallies, protests, etc.), and other data. Generally, contents of each client portfolio P1-Pn may be defined by a client. The mapping system data storage entity 20 may store multiple portfolios corresponding to one or more clients, in an embodiment.

Although the embodiment shown in FIG. 1 illustrates the data storage entity 20 as being locally accessible to the one or more computing devices 22 of the mapping system 10, in some embodiments, the data storage entity 20 may be remotely accessed by the one or more computing devices 22 via a link and a network (not shown) such as a private network, a public network (e.g., the Internet), or some combination of public and private networks. The mapping system data storage entity 20 may include one or more data storage devices of any known non-transitory, tangible storage media technology (e.g., disks, solid state devices, data banks, servers, cloud storage, etc.) that appear and operate as a single logical data storage device 20. Similarly, the one or more computing devices 22 may include one or more networked computing devices (e.g., stand-alone computing device, one or more servers, cloud computing devices, and the like) that appear and operate as a single logical computing device 22. Each of the one or more computing devices 22 may include a processor, a non-transitory program memory storing computer-executable instructions, a non-transitory random-access memory (RAM), and one or more communication links.

Returning to the impact data manager 5 at the front-end, the dynamic data delivery module 12 may include a set of computer-executable instructions stored on one or more non-transitory, tangible computer-storage media such as a non-transitory memory storage device. The computer-executable instructions may be executable by one or more processors. The one or more processors and the one or more computer-storage media on which the dynamic data delivery module 12 is stored may or may not reside in a same physical computing device. In a non-limiting embodiment, the one or more processors may be included in a first set of computing devices, and the one or more computer-storage media may be included in a second set of computing devices. Generally, the computer-executable instructions of the dynamic data delivery module 12, when executed by one or more processors, may allow for dynamic selection, preparation and upload of source data for inclusion in a client portfolio stored at the mapping system 10. Additionally, the computer-executed instructions of the dynamic data delivery module 12, when executed by the one or more processors, may allow for a user to interface with the impact data manager 5 during the dynamic preparation and upload of the source data.

In some embodiments, the dynamic data delivery module 12 may be communicatively connected with one or more other modules included in the impact data manager 5. For example, the dynamic data delivery module 12 may be coupled to an intelligence cube module 26 for remotely generating dynamic intelligence cubes from the mapping system 10, such as described in U.S. patent application Ser. No. 13/493,100 entitled "Impact Data Manager for Generating Dynamic Intelligence Cubes" and filed Jun. 11, 2012, the entire disclosure of which is hereby incorporated by reference. The generated intelligence cubes may be used in excising information from one or more client portfolios P1-Pn for use in reports and other intelligence tools. Similar to the dynamic data delivery module 12, the intelligence cube module 26 and/or any other modules may each be communicatively connected to the user interface 15 and to a data storage entity 30 of the impact data manager system 5.

The dynamic data module 12 may automatically transform, convert or map, based on one or more rules corresponding to the mapping system 10, client-indicated source data from at least one first format into a second format, where the second format is compatible with the mapping system 10. In an embodiment, the client-indicated source data may correspond to a set of insured or insurable properties and/or to a set of tangible resources or capital. The source data may include indications of one or more physical or geographical locations, such as indications of geographical areas or locations of real properties. The indications of the one or more physical or geographical locations may include indications of geo-spatial coordinates, such as latitude, longitude and/or altitude, in an embodiment. The location indications may include at least a portion of a mailing or postal address (e.g., IS03 Country, Street Address, City, State, Postal Code, etc.), in an embodiment. In another embodiment, the location indications may include satellite navigation coordinates or ranges thereof such as GPS (Global Positioning System) coordinates, or coordinates of other satellite navigation systems (e.g., GLONASS (Russian Global Navigation Satellite System, European Union Galileo positioning system, Chinese Compass navigation system, Indian Regional Navigational Satellite System, etc.). The source data may additionally or alternatively include location indications using other data types, including but not limited to numeric, text, date, Boolean, user-defined data types, and other data types.

The source data may be client-generated or client-collected. For example, the client may populate at least a portion of a data file to include in the source data that is to be uploaded or delivered from the impact data manager system 5 to the mapping system 10. In some instances, some portion of the source data may be collected or obtained from a third party. For example, the client may retrieve geospatial coordinates from another database or application to include in a source data file for upload or delivery to the mapping system 10.

The first format or original format of the source data may be any format in which data may be stored or represented, including but not limited to plain text, delimited text, fixed length fields, databank format, dif format, and the like. In some embodiments, the first format may be a database format compatible with a commercial or industry standard format, for example Microsoft® Access, Microsoft Excel, dBASE™, SQL (Standard Query Language), and/or any other database format. The source data may include data of more than one format, for example, when the client collects or enters the source data from various different sources or files.

The dynamic data delivery module 12 may perform a validation or verification on the source data prior to delivering the source data to the mapping system 10. The validation or verification may be based on one or more rules 28a corresponding to the mapping system 10. The rules 28a may indicate a set of characteristics, limits and/or boundary conditions of data fields and/or contents of data fields corresponding to the second format or target format, so that data in the second format will be understood by or will be compatible with the mapping system 10 for storage in a portfolio. As such, the set of rules 28a may be referred to interchangeably herein as a set of "portfolio rules," "mapping rules," or "mapping system rules."

The set of rules 28a may originate at the mapping system 10 (e.g., at the mapping system data storage entity 20), and in some embodiments, the set of rules 28b may be stored as a "master copy" at the mapping system 10. The mapping system 10 may deliver a copy 28a of at least a portion of the rules 28b to the impact data manager 5 via the links 18a, 18b. For example, a copy 28a of at least some of the rules 28b may be downloaded or delivered by a suitable transfer mechanism, either automatically and/or per user request. In an embodiment, the mapping system 10 may deliver the copy of set of rules 28a (or may deliver an update to the set of rules 28a) in response to a request of the dynamic data delivery module 12. The copy of set of rules 28a may be locally stored at the impact data manager system 5 in a local data storage entity 30, so that the dynamic data delivery module 12 may access the rules 28a to perform transformation, validation and/or verification of the source data, or other tasks.

In an embodiment, the dynamic data delivery module 12 may perform the validation of the source data based on both the set of rules 28a and based on user input. For example, the user may elect a tighter boundary than allowed by the rules 28a, or the user may modify or make one or more exceptions to the rules 28a. In another example, the user may define an additional rule to use during the transformation, validation and/or verification processes. A copy of a basic set of rules, for example, may be provided to the user for including additional limitations. In some implementations, the user is restricted from deleting one or more rules and/or broadening (e.g., loosening) one or more rules. For example, the mapping system may require certain numerical information to have at least a minimum granularity such that a rule requiring a certain mathematical granularity will be enforced.

In an embodiment, the validation process may determine whether or not the data fields of the source data and the contents therein are compatible with the second format or are able to be transformed or to be converted to be compatible with the second format. For example, if the presence of a particular data field is required in the second format so that the mapping system 10 may perform its functions, the validation process may determine whether or not the particular data field is present in the source data. In another example, if a data field in the second or target format requires a particular length or syntax, the validation process may determine whether or not the corresponding data field of the source data in the first or original format is able to be so transformed or converted.

In an embodiment, the validation process may include a numerical value validation, e.g., an evaluation of whether or not a value included in the source data falls within an expected range. Additionally or alternatively, the validation process may include a control total validation to crosscheck values and totals across various dimensions of the source data (e.g., columns and rows, subsets, categories, and the like). Further, the validation process may include a geographical location validation, such as a validation of a longitude/latitude pair, a mailing address, or some other geographical location validation. For example, portions of a mailing address may be validated for cohesiveness, e.g., does the ZIP code correspond to the state, is the house or building number valid for the street, etc.

In an embodiment, during the validation process, the dynamic data delivery module 12 may determine an anomaly, inconsistency, or incompatibility. For example, the dynamic data delivery module 12 may determine a presence of an anomaly in a particular data field, such as when the particular data field is a keyed field or includes a reference that cannot be resolved at the mapping system 10. In another example, the dynamic data delivery module 12 may determine a discrepancy between the contents of two fields, such as a ZIP code that does not correspond to the indicated state. In yet another example, the dynamic data delivery module 12 may determine a numerical anomaly, such as a policy expiration date occurring before a policy inception date. In still yet another example, the dynamic data delivery module 12 may determine a field property anomaly, such as when the target format requires (for a particular data field) at least a field length of X and the original format uses a field length of Y, where Y is less than X. Other types of anomalies or discrepancies may be possible.

In an embodiment, the dynamic data delivery module 12 may automatically notify the user of any discrepancies or anomalies. In an embodiment, the dynamic data delivery module 12 may take corrective action or automatically adjust the source data to resolve the anomaly or inconsistency. For example, the dynamic data delivery module 12 may bring the anomaly to the user's attention via the user interface 15 and await a user response (e.g., "Keyed Field Detected in Input Data; Please Correct") without taking any corrective action. In some scenarios, the dynamic data delivery module 12 may provide a suggested corrective action along with the notification, and may await an indication of an approval from the user. In some embodiments, the dynamic data delivery module 12 may automatically perform corrections or adjustments without any user notification or input (e.g., synchronizing source data currency values that are represented by "int" data types and source data currency values that are represented by "char" data types into a common "money" data type, extending a field length, changing a field name from "Policy ID" to "Policy Number," etc.).

In some scenarios, the transformation or conversion from the first format to the second format may be a direct, rote translation from one exact format to another exact format. However, the techniques described herein are not so limited. In some embodiments, a source data file may include multiple different source data formats (e.g., multiple different "first formats"), and a single transformation of the source data file by the dynamic data delivery module 12 may convert data of multiple different source data formats included in the source data file to fit within the boundaries of the second format. As such, the rules 28a corresponding to the second or target format need not conform to a rigid syntax, but may be sufficiently flexible to accommodate the distinguishing characteristics of each different original source data format. Accordingly, multiple direct, rote translations need not be performed, and a client may easily upload source data from multiple different sources and formats to be processed by the mapping system 10 in a single transformation and validation process. In one particular example, dates may be recognized as having a number of different formats within a same source data file (e.g., DD-MM-YY, DD-MM-YYYY, DD-Month-YY, etc.), and upon identification of a "date" the format may be transformed into a single standardized format. Similarly, in another example, state names (e.g., Vermont vs. VT) may be recognized and transformed to a standard format. In some implementations, file metadata may be reviewed to determine formatting. For example, an Excel spreadsheet may include metadata regarding formatting of columns, rows, and individual fields.

In some implementations, the transformation or conversion from the first format to the second format involves determining a second data format that minimizes (reduces) storage space of the information. The second data format, for example, may be selected in part as being sufficiently precise to be compatible with the mapping system 10. For example, numerical values provided in one or more data fields in a first format may be rounded such that the number of decimal points stored is reduced. In another example, data which is not necessary to the mapping system and which may be regenerated later may be expunged. In a particular example, a state may be derived from a zip code such that only the zip code would need to be stored.

Once the source data has been validated or verified, in an embodiment, the dynamic data delivery module 12 may encrypt and/or compress the source data to further prepare the source data for delivery. Encryption and compression may be selectable, in an embodiment. The dynamic data delivery module 12 may cause the source data (whether encrypted or non-encrypted, and/or compressed or non-compressed) to be delivered to the mapping system 10 via the link 18a. In an embodiment, the source data may be delivered to the mapping system 10 via a proprietary delivery system. In an embodiment, direct uploading or delivery of source data to the mapping system 10 using the impact data manager 5 may be an automated process that uploads or delivers data on-demand from multiple sources for use with the mapping system 10.

The mapping system 10 may receive the source data from the impact data manager 5, and may store the source data in an indicated client portfolio. In an embodiment, the mapping system 10 may perform control total validation on the received source data, and may provide results of the control total validation to the impact data manager 5 for a user to accept or decline. If the user accepts the control total validation, the source data received at the mapping system 10 may be published, and if the user declines the control total validation, the source data received at the mapping system 10 may be removed or deleted from the system 10. The mapping system 10 may perform one or more mapping functions on published data included in the client portfolio and one or more impact events.

Thus, as discussed above, the dynamic data delivery module 12 of the impact data manager 5 may automatically transform the source data from one or more original or first formats into a target or second format, where the second format comports with the requirements and boundaries of the mapping system 10. As such, the second format may enable functionality of the impact-on-demand system mapping system 10, and the dynamic data delivery module 12 may manipulate source data to fit the second format. The validity and format of the transformed, validated source data allows the mapping system 10 to perform mapping functionality in real-time, without being hindered by data incompatibilities and other anomalies or errors.

Some of the data fields of the second format may be designated as fields that are required at the mapping system 10 in order for the mapping system 10 to enable minimum functionality. Other required or recommended fields may be additionally or alternatively designated to enable full functionality in the mapping system 10. In embodiments where a mapping system 10 is flexible to allow for additional fields, all additional fields from a source dataset may be transformed into the second format for delivery to the mapping system 10. For the transformation of any additional fields, an intuitive naming standard for the additional fields may be used.

In an embodiment, to ensure base functionality of the impact-on-demand mapping system 10, a set of data fields may be designated as being required. That is, any source data that is transformed into the second format may be required to include at least the set of required data fields. Typically, the set of required data fields may indicate a physical, geographical or geo-spatial location to support Geo-Coding (in which geo-spatial data such as longitude and latitude are tagged to the raw source data).

A first example set of required data fields is listed below. The first example set below corresponds to mailing or postal addresses of target locations.

First Example Set of Required Data Fields (Address-Based)

Street Number—the Street Number data field may be populated with an indication of the street number corresponding to a location at which a risk is located. Special characters (i.e. #, /, &, *, etc.) may be extracted or eliminated from this field during the automatic transformation process, as well as any unnecessary information such as driving directions or insured names.

Street Name—the Street Name data field may be populated with an indication of the street name corresponding to a location at which a risk is located. Special characters (i.e. #, /, *, etc.) may be extracted or eliminated from this field during the automatic transformation process, as well as any unnecessary information such as driving directions or insured names.

Street Address—the Street Address data field may be populated with an indication of the street number and street name corresponding to a location at which a risk is located. Special characters (i.e. #, /, &, *, etc.) may be extracted or eliminated from this field during the automatic transformation process, as well as any unnecessary information such as driving directions or insured names. In some embodiments, if the Street Address field is included in the set of required data fields, the Street Name and Street Number fields may be eliminated from the required data set.

City—the City data field may be populated with an indication of the city in which the risk is located.

2-Digit State Abbreviation (ISO State Code/Abbreviation)—the International Organization for Standardization (ISO) for State Code/Abbreviation data field may be populated with an indication of the code or abbreviation corresponding to the location of the risk.

ZIP Code (9- or 5-digit) or Postal Code—In an embodiment, the ZIP Code data field may be populated with an indication of a 9-digit or 5-digit ZIP Code corresponding to the location of the risk. In another embodiment, the Postal Code data field may be more broadly populated with a variety of postal code formats encompassing multiple nations. In an embodiment, all risks included in the source data must have at least a valid 5-digit ZIP Code. The ZIP Code field may be verified as to whether or not the ZIP code is valid within the state indicated by the ISO State Code/Abbreviation data field. In another embodiment, the field may be populated with an international Postal Code that corresponds to the country or area.

County Name—the County Name data field may be populated with an indication of the county in which the risk is located. The indication of the county may correspond to a FIPS (Federal Information Processing Standard) county code or may be an alphanumeric county name. In some embodiment, a County Name is not required.

Of course, the first example required data set is not limited to only the above fields. In other embodiments, one or more other data fields may be added to or deleted from the first example set.

In some embodiments, instead of the set of required data fields being defined based on a mailing or postal address as discussed above, the set of required data fields may be based instead on other types of location or geographical identifiers, e.g., latitude/longitude pairs, GPS coordinates, or other suitable location identifiers. For example, a required set of data fields to support base functionality of the mapping system 10 may use geo-coding. In an embodiment, the dynamic data delivery module 12 may default to producing geo-coded fields during the automatic transformation of the source data into the second format. The geo-coded fields may be populated with data from the source data and/or from another source. Some of the geo-coded fields may be automatically populated by the impact data manager 5, in some scenarios. Thus, in an embodiment, if the source data in the first format includes pre-populated geo-coded fields, the impact data manager 5 may directly utilize the pre-populated geo-coded fields of the first format in the second format. In scenarios where one or more required geo-coded fields are not provided in the first format (e.g., when the source data includes postal addresses), the impact data manager 5 may automatically transform the source data into the desired geo-coded fields.

An example set of required data fields using geo-coding is listed below.

Second Example Set of Required Data Fields (Geo-Coding)

Latitude—the Latitude data field may be populated with an indication of a latitude value corresponding to the risk.

Longitude—the Longitude data field may be populated with an indication of a longitude value corresponding to the risk.

In some embodiments, other geo-coding fields may be included in the set of required data fields, e.g., "Altitude" or "Depth."

While the above described fields may be required to support a minimal mapping functionality of the mapping system 10, in some embodiments, one or more additional fields may be included in the transformed source data to enable additional functionality of the mapping system 10. For example, if the client includes additional data in the original source data beyond any required data, the impact data manager 5 may be configured, in an embodiment, to automatically determine the inclusion of the additional data and to automatically transform the additional data of the first format to be compatible with the second format.

The additional data fields may be used by the mapping system 10 for "look-ahead" technology or features, in an embodiment. For example, the mapping system 10 may analyze data fields and, based on the analysis, may dynamically make changes to the functionality and/or display choices available to the user. As such, if certain data exists within the data set, the mapping system 10 may cause extra "look ahead" functionality to be presented or executed. Examples of look-ahead features may include (but are not limited to) geo-coding (e.g., when the required data fields are addressed-based), thematic shading (e.g., geographical shading on a map based on county or other location), quick exposure calculations (e.g., detailed calculation of exposed limits for included data), risk analysis, single risk modeling, and the like.

In some embodiments, to support desired look-ahead features, the dynamic data delivery module 12 may determine if certain additional information needs to be included in the transformed source data, whether or not the additional information has been included by the client in the original source data. In these embodiments, the dynamic data delivery module 12 may automatically provide or enable extra menus, features, fields and calculations to generate populated data fields of the second format.

Examples of possible additional data fields are described below. For ease of reading, the example additional data fields are grouped into categories, but any number of additional data fields of zero, one, or more categories may be included in the automatic transformation performed by the dynamic data delivery module.

Examples of Optional Additional Data Fields:

Policy Terms

Policy Number—the Policy Number data field may be populated with an indication of an insurance policy identification (e.g., a number, an alphanumeric code, or similar). The Policy Number data field may be needed to identify multi-location policies, to generate policy averages and to calculate losses to individual policies that cover multiple locations. For a single location policy, the Policy Number data field may be populated as a unique number or identifier. For a multi-location policy, the Policy Number data field may be populated with a same number or identifier for all locations under the multi-location policy.

Policy Name—the Policy Name data field may be populated with an indication of a name associated with a policy.

Policy Premium—the Policy Premium data field may be populated with an indication of a direct written premium for policies in force as of the date of the source data or as of an indicated date.

Policy Limit—the Policy Limit data field may be populated with an indication of a policy limit for policies in force as of the date of the source data or as of an indicated date.

Line of Business—the Line of Business data field may be populated with a code indicating a particular line of business. Examples of Lines of Business may include commercial fire (including, in some instances, commercial extended coverage), dwelling fire (including, in some instances, personal extended coverage), homeowners, contents-only homeowners, mobile homeowners, commercial multi-peril, commercial inland marine, commercial auto, personal auto, farm owners, and other lines of businesses. The set of codes corresponding to lines of businesses may be programmable based on client.

Policy Inception Date—the Policy Inception Date data field may be populated with an indication of the effective date of policy coverage.

Policy Expiration Date—the Policy Expiration Date data field may be populated with an indication of the date on which coverage is set to expire unless renewed.

Risk Characteristics/Location Details

Square Footage—the Square Footage data field may be populated with an indication of the total square footage corresponding to real property associated with the risk. In an embodiment, the Square Footage data field may be populated with an indication of a value based on a personal lines policy.

Construction Class—the Construction Class data field may be populated with an indication of one or more structural properties corresponding to the risk.

Occupancy Type—the Occupancy Type data field may be populated with an indication of the general occupancy of the risk.

Year Built—the Year Built data field may be populated with an indication of the year of construction corresponding to the risk.

Number of Stories—the Number of Stories data field may be populated with a number of stories of a structure corresponding to the risk.

Number of Buildings (Risk Count)—if the source data is aggregated, the Number of Buildings data field may indicate a number of risks included in the aggregation. For policies corresponding to multiple buildings, the Number of Buildings data field may be populated with an indication of the number of building structures covered by the policies.

Peril Endorsements

Wind Endorsed—the Wind Endorsed data field may be populated with an indication of whether or not a policy is covered for windstorm loss. In an embodiment, a "Y" in this field may indicate the policy is covered for losses due to wind, while an "N" in this field may indicate no wind coverage.

Earthquake Endorsed—the Earthquake Endorsed data field may indicate whether or not a policy is endorsed with earthquake coverage. In an embodiment, a "Y" in this field may indicate the policy is covered for losses due to earthquake, while an "N" in this field may indicate no earthquake coverage.

Tornado and Hail Endorsed—the Tornado and Hail Endorsed data field may indicate whether or not a policy is endorsed with tornado and hail coverage. In an embodiment, a "Y" in this field may indicate the risk is covered for losses due to tornado hail, while an "N" may indicate no tornado hail coverage.

Wildfire Endorsed—the Wildfire Endorsed data field may indicate whether or not a policy is endorsed with wildfire coverage. In an embodiment, a "Y" in this field may indicate the risk is covered for losses due to wildfire, while an "N" may indicate no wildfire coverage.

Data fields that represent other peril endorsements may be included as additional or alternative data fields. For example, other peril endorsements may include Flood, Worker Compensation, Terrorism, Winter Storm, and other perils.

Multi-Peril Capabilities

The mapping system 10 may be capable of receiving a source data file for two or more perils (e.g., one import file for more than one peril). Thus, site, coverage and other multi-peril capability values may be included for perils that are applicable to the source data. Each multi-peril capability data field may be respectively applied to each different peril, hence the descriptions of the capabilities herein do not refer to a specific peril. Examples of capabilities may include zero, one, or more of the following data fields:

Total Insured Value:

TIV (Total Insured Value)—the Total Insured Value data field may be populated with an indication of a total insured value of the location. For peril specific TIV values, an alphanumeric peril abbreviation may be added followed by an underscore before TIV (for example: HU_TIV for a Hurricane peril, EQ_TIV for an Earthquake peril, TH_TIV for a Tornado Hail peril, etc.).

Location Details—Multi-Location Policies:

Location Name—The Location Name data field may be populated with an indication of a name or other identification of an individual location of a multi-location policy.

Location Number—the Location Number data field may be populated with an indication of a number to identify an individual location of a multi-location policy.

Location Premium—the Location Premium data field may be populated with an indication of a premium value of a location included in a multi-location policy.

Location Limit—the Location Limit data field may be populated with an indication of a limit value of a location included in a multi-location policy.

Layer Details:—the Layer Details data field(s) may include an attachment point of the policy, policy limit and layer amount.

Layer Limit—the Layer Limit data field may be populated with an indication of a layer limit. The value of the layer limit may be used by the mapping system 10, for example, in a capped limit calculation.

Attachment Point—the Attachment Point data field may be populated with an indication of the attachment point for the layer. The attachment point may be used by the mapping system 10, for example, in a capped limit calculation.

Capped Limit—the Capped Limit data field may be used for multi-location policies to determine a cumulative limit across multiple locations, e.g., for policy limits, attachment points, location limits, etc.

Participation Percent—the Participation Percent data field may be populated with an indication of a participation percent for the layer. The participation percent may be used by the mapping system 10, for example, in a capped limit calculation.

Site Limits and Deductibles:

Site Limit—the Site Limit data field may generally be populated with a total insured limit of the location when each location of a multi-location policy has a separate limit. In cases where the site limit equals the policy limit, the site limit may not be required.

Site Deductible—The Site Deductible data field may be populated to report a deductible value for each location of a multi-location policy. For single location policies, the Site Deductible data field may be the same as the Policy Deductible data field.

While any or all the above example additional data fields may be optional, a subset of the additional data fields may be designated as being required to achieve full functionality of a particular look-ahead feature. In an embodiment, various different subsets of additional fields may be designated as required for respective different look-ahead features or functions.

FIGS. 2A-2L illustrate an example set of interactions between the impact data manager 5 and the user interface 15 to generate and deliver client source data to a mapping system 10. Each of the FIGS. 2A-2L illustrates a different screen shot that may be displayed on the user interface 15. In embodiments with the impact data manager system 5, the dynamic data delivery module 12 may be configured to cause the screens of FIGS. 2A-2L (or the information therein) to be presented at the user interface 15. Indications of user inputs may be received at the user interface 15 and may be delivered to the dynamic data delivery module 12 of the impact data manager 5 for processing. While FIGS. 2A-2L are described below in conjunction with the impact data manager system 5 and the impact-on-demand or mapping system 10 of FIG. 1, any or all of FIGS. 2A-2L may be used conjunction with other suitable systems.

Figure 2A:
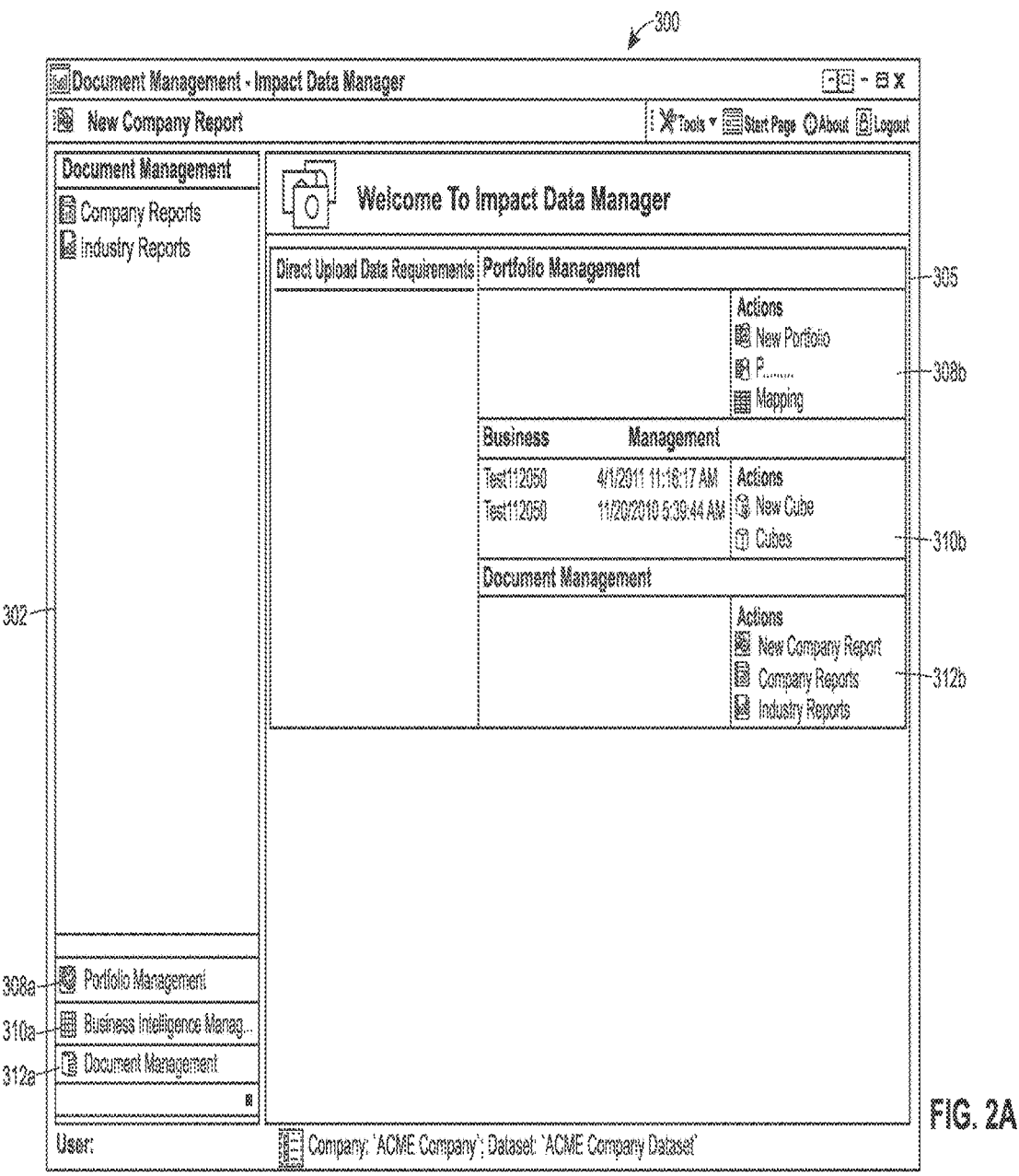

FIG. 2A depicts an example screen shot 300 (e.g., a "home" or "welcome" screen 300) that may be displayed when a user initially accesses the impact data manager system 5 via the user interface 15. In an embodiment, the impact data manager 5 may require permission-based access, e.g., using a login/password combination, biometric identifier, or other secured access mechanism.

In some embodiments, the home screen 300 may be partitioned into multiple areas 302, 305. A first area 302 of the screen 300 may include a display of selectable user controls 308a, 310a, 312a corresponding to high-level management functions that are provided via the impact data manager 5. For example, the impact data manager system 5 may provide a portfolio management function 308a, a business intelligence management function 310a, a document management function 312a, and/or any number of other high-level management functions (not shown). A second area 305 of the screen 300 may include a display of selectable user controls 308b, 310b, 312b for sets of actions that respectively correspond to each of the high-level data management functions 308a, 310a, 312a. Of course, the display of the high-level management functions 308a-312a in the screen portion 302 and corresponding actions 308b-312b in the screen portion 305 is not limited to the arrangement 300 shown in FIG. 2A. Other arrangements of presentation formats are also possible, for example, one or three or any another number of areas may be displayed on the screen 300, the information displayed on the screen 300 may be displayed on a series of screens instead of on a single screen, the high-level management functions 308a-312a and/or the respective sets of actions 308b-312b may be presented in one or more drop-down selection menus or one or more pop-up selection menus or other suitable presentation formats, etc.

In the example scenario, the dynamic data delivery module 12 may receive indications of a user selection of the Portfolio Management function 308a and the action New Portfolio 308b. By this selection combination, the user indicates to the impact data manager 5 that he or she desires to prepare source data for use in a new portfolio to be stored at the mapping system 10.

Figure 2B:
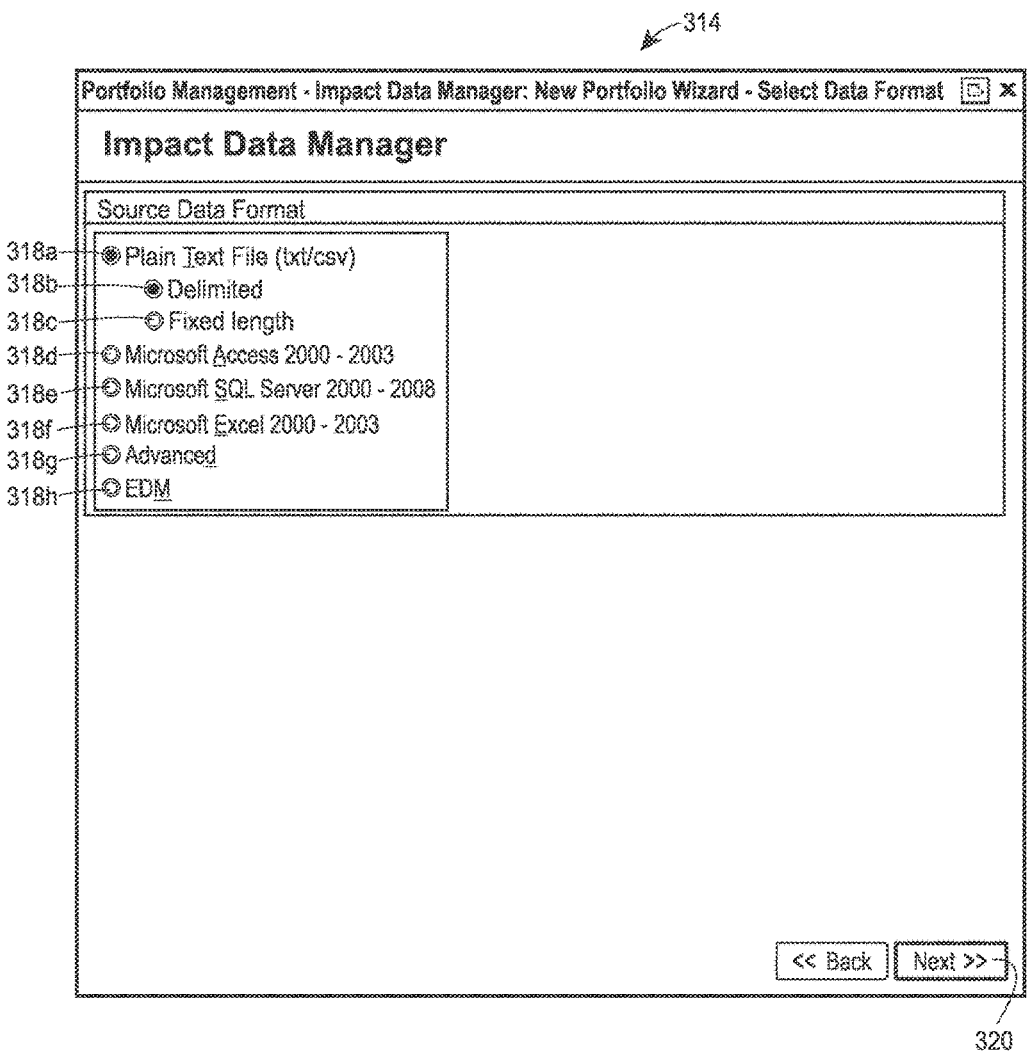

The system 5 may respond to these user selections by displaying a format identification screen 314 as shown in FIG. 2B. The screen 314 may include a display of selectable user controls 318a-318h with each control 318a-318h corresponding to a different source data or database format or type. In an embodiment, the "advanced" user control 318g may correspond to any data format that is supported by the mapping system 10 when a driver corresponding to the any data format resides on or is accessible to the mapping system 10. Of course, the complete set of possible data or database formats is not limited to the set 318a-318h shown in FIG. 2B. For example, one or more data formats or types 318a-318h may be omitted from the screen 314, and/or one or more other database formats (not shown) may be included in the screen 314. In an embodiment, a selectable control for a user-defined data format (not shown) may be included on the screen 314, and upon user selection of the control, the user may enter information describing or defining the user-defined data format. In the example scenario illustrated by FIG. 2B, the user has indicated, by selecting the controls 318a and 318b, that the source data to be delivered to the mapping system 10 is in a format corresponding to a delimited plain text file. After selecting the data format, the use may select the "Next" user control 320 or other suitable user control to continue.

Figure 2C:
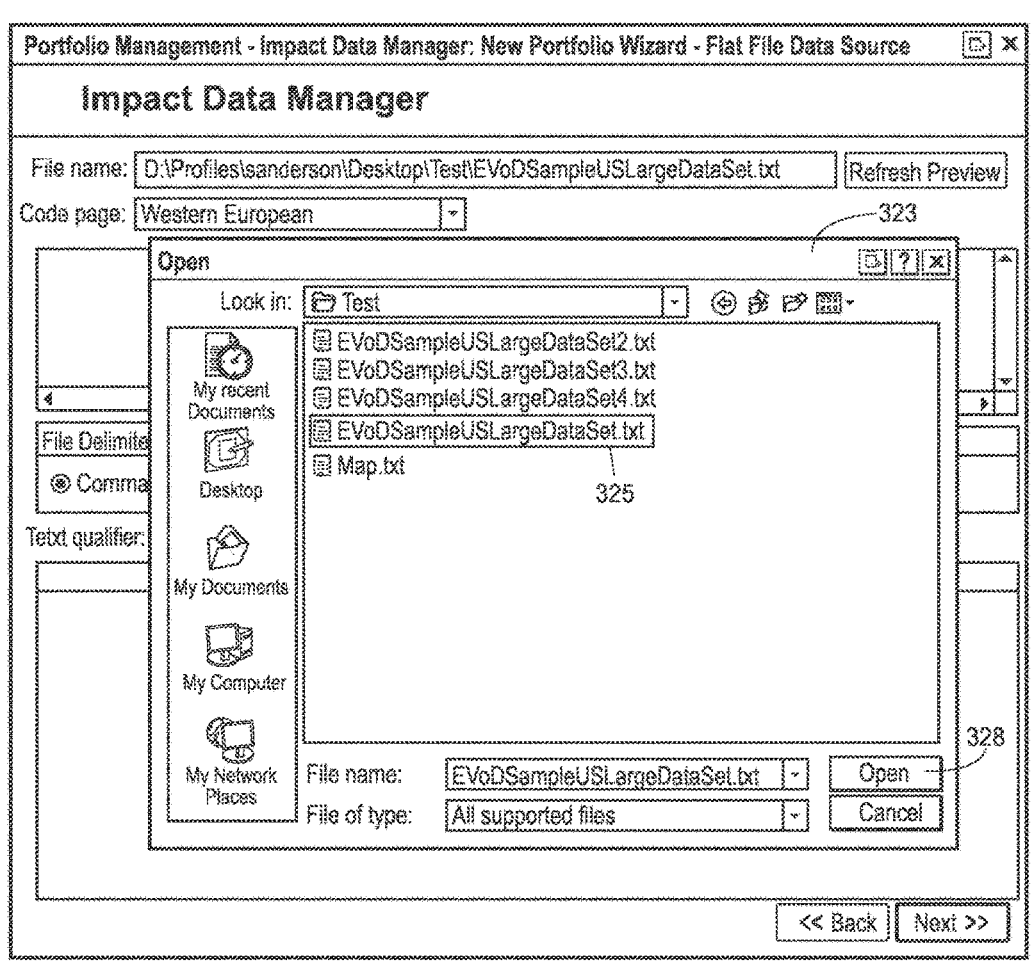
Figure 2D:
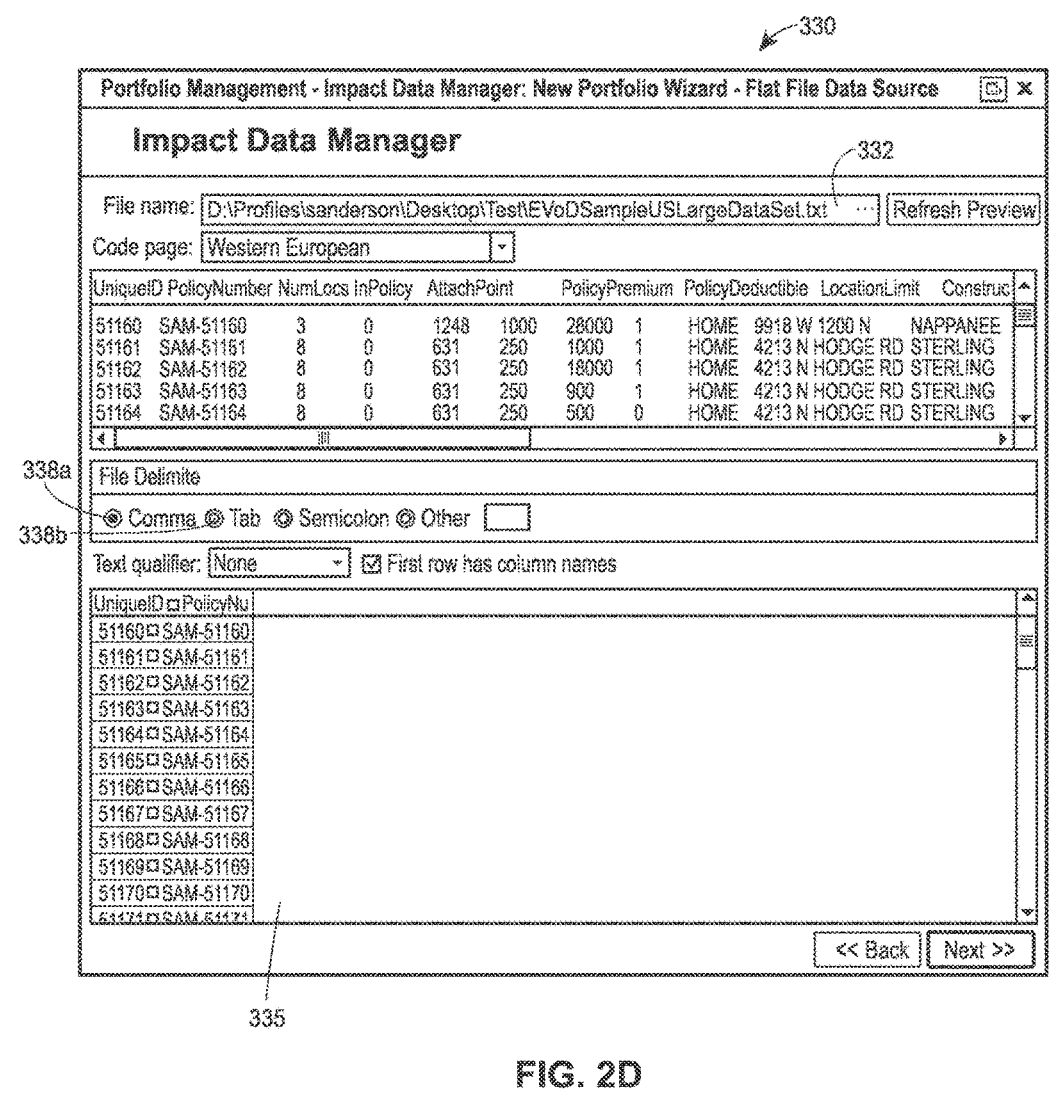
Figure 2E:
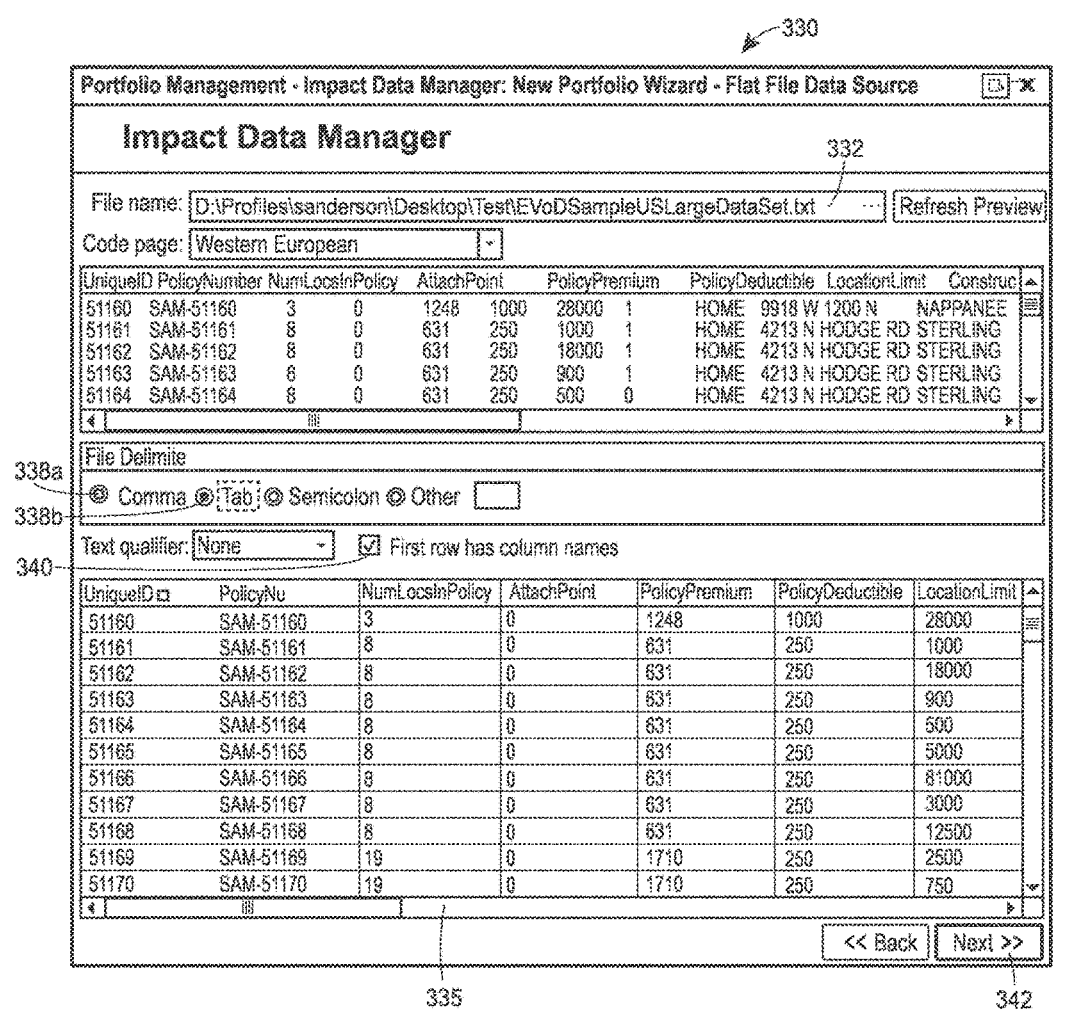
Figure 2F:
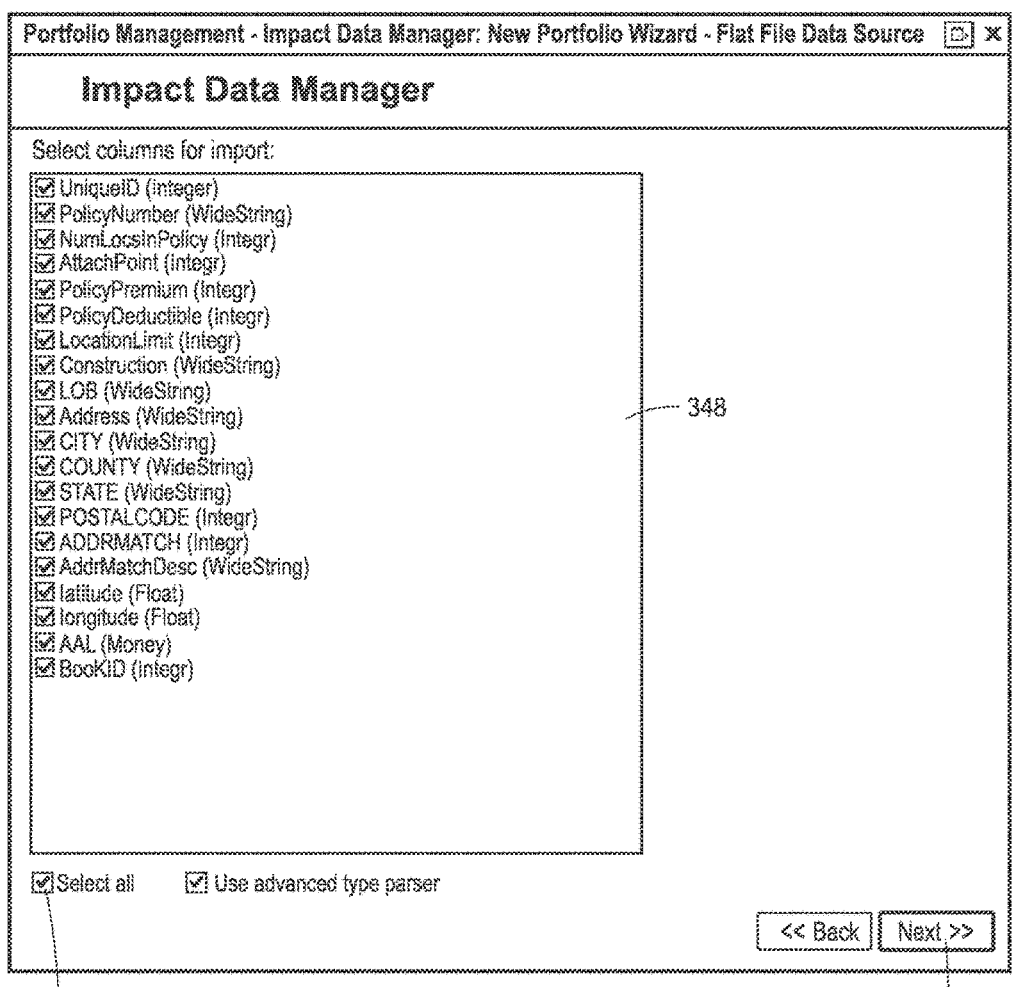

Turning to FIG. 2C, upon receiving the indication of the selected data format, the system 5 may present a window or screen 322 via which the user is able to indicate a desired file of the format type 318a, 318b (as previously selected in window 314 of FIG. 2B) that includes the source data to be delivered to the mapping system 10. The window 322 may allow user to search for the desired data file throughout a file directory structure (e.g., via a pop-up window 323 or other suitable mechanism) and to indicate the desired data file by highlighting 325 a file and selecting the "Open" user control 328 or other suitable user control.

The impact data manager 5 may open or access the source data file, as illustrated by screen 330 of FIG. 2D. In particular, the impact data manager 5 may open the file based on the data format indicated at the format identification screen 314 of FIG. 2B. The name of the file and, in some cases, the path name to the file may be displayed 332 on the screen 330. The impact data manager 5 may attempt to display the file contents of the selected file in a first portion 335 of the screen 330. In the scenario illustrated by FIG. 2D, the display 335 of the file contents is incomplete, garbled, or unexpected, as the impact data manager 5 automatically applied a comma 338a as a default delimiter, while the source data file is delimited by a tab.

In FIG. 2E, the user has indicated the correct delimiter 338b on the screen 330. Furthermore, the user has indicated that the source data file includes column names or identifiers in its first row (reference 340). Based on these indications 338, 340, the impact data manager 5 may be able to parse the source data file, and may coherently display the contents of the source data file in the first portion 335 of the screen 330. In some embodiments, rather than indicating the delimiter 338b used in the source data file and/or the presence of column headings or data identification 340 at the screen 330 after an attempt to display the file contents has been made, the indications may be received a priori, e.g., the indications may be received concurrently with the data format selection at the format identification screen 314 (FIG. 2B). When the impact data manager 5 has parsed the contents of the source data file and the display 335 of the contents is coherent or otherwise suitable, the user may indicate as such by selecting the "Next" user control 342 or other suitable user control.

The impact data manager 5 may allow the user to select some or all of the source data contained within the source data file 332 for transformation and upload or delivery to the mapping system 10 to be stored as a portfolio, as shown by the data selection screen 345 of FIG. 2F. In the data selection screen 345, the impact data manager 5 has automatically identified a complete set of data fields 348 included in the source data file 332 from the column headers of the source file 332 (e.g., UniqueID, PolicyNumber, NumLocsInPolicy, etc.), and has automatically presented the set 348 on the screen 345. Via the user control 350, the user may select all of the data fields 348 for inclusion, or the user may select a subset of the data fields by checking and un-checking (or otherwise selecting and unselecting) individual data fields, as desired. In the example scenario of FIG. 2F, the user has selected all of the data fields for inclusion. When the user is satisfied with his or her data field selection, the user may indicate as such by selecting the "Next" user control 352 or other suitable user control.

Figure 2G:
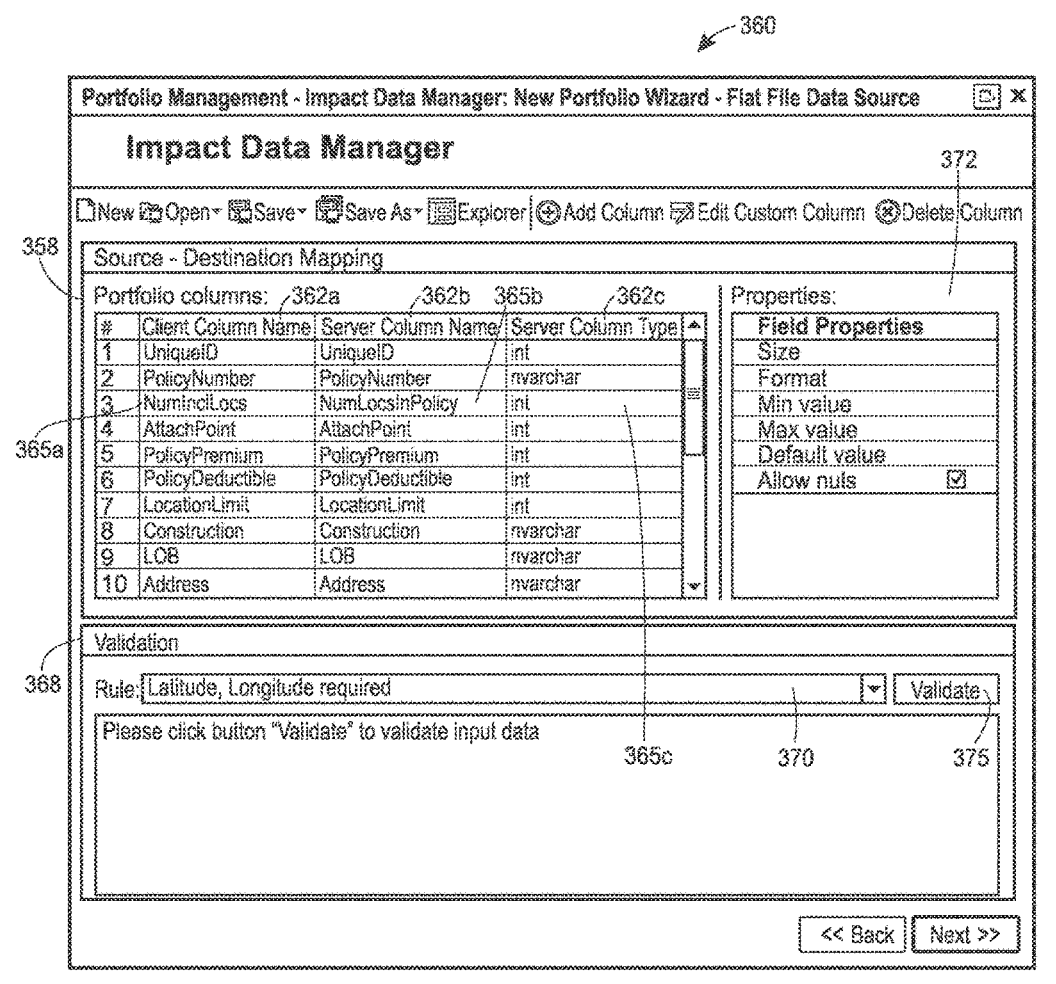

The impact data manager 5 may automatically convert, transform or map the source data from its original or first format to a portfolio, target or second format that is compatible with the mapping system 10. To this end, the impact data manager 5 may display a validation screen 360 as illustrated in FIG. 2G. In an embodiment, the screen 360 may include a first portion 358 that indicates the data fields selected by the client for inclusion in the portfolio. In an embodiment, the first portion 358 may include, for each selected data field, a column heading or identification of data field indicating the original format as used in the source data file 362a, a corresponding column heading of data field indicating the converted format to be used in the portfolio 362b, and an indication of the data type of the portfolio data field 362c (e.g., int, nvarchar, etc.). For example, for the selected data field corresponding to the number of locations in a policy, the source data field is identified by "Num InclLocs" (reference 365a), the corresponding portfolio data field is identified by "NumLocsInPolicy" (reference 365b), and the data type of the data in the "NumLocsInPolicy" portfolio data field is "int" (reference 365c).

The screen 360 may include a second portion 368 via which a user may interface with the impact data manager 5 to validate the source data (in its original format, target format, or both). The validation may be performed based on a set of rules such as the set of mapping rules 28a of FIG. 1. The rules 28a may indicate a set of characteristics, limits and/or boundary conditions of the target format, so that source data in the target format (e.g., the converted source data) will be understood by or will be compatible with the mapping system 10. In an embodiment, the set of rules 28a is obtained from the mapping system 10, e.g., via a download or some other suitable data transfer mechanism of at least a portion of a master set of rules 28b, and the local copy of rules 28a may be at least partially updated automatically or per user request.

The user may select one or more rules 28a via, for example, a drop-down menu 370 or other suitable user control selection mechanism. In the example shown in FIG. 2G, the user has selected a rule "latitude/longitude required," which indicates that the converted source data must include latitude/longitude pairs to identify geographical locations. In an embodiment, more than one rule may be selected by the user. In an embodiment, a default set of rules may be automatically selected by the impact data manager 5 and may be indicated in the second portion of the screen 368.

In an embodiment, data field properties may be validated. For example, as shown in FIG. 2G, a third portion 372 of the screen 360 may indicate properties, boundaries or other constraints to be applied to each of the data field names. Properties corresponding to a particular data field may be displayed in the third portion 372 when the particular data field is selected in the first portion 358 of the screen 360. For example, when the user selects the data field "PolicyPremium," a set of properties including a maximum and minimum currency amount for the policy premium may be displayed in the third portion 372 of the screen 360. In some embodiments, a default set of properties 372 may be automatically selected by the impact data manager 5 for at least one of the data fields 358, and the user may change one or more default property values during the validation process.

When the user is satisfied that he or she has selected the desired rules 28a in the second portion 368 of the screen 360 and has indicated the desired properties 372 for desired data fields 358, the user may indicate as such by selecting the "Validate" user control 375 or other suitable user control. Upon receiving the selection of the "Validate" control 375, the impact data manager 5 may automatically validate the data fields 358 and the contents therein based on the rules indicated in the second portion 368 and in the third portion 372 of the screen 360. For example, based on the rules 368, 372, the impact data manager 5 may validate the data fields and/or the contents of the data fields in the first format, the data fields and/or the contents of the data fields in the second format, or both.

In an embodiment, the impact data manager 5 may automatically correct any anomalies or errors found during the validation process and may indicate such automatic corrections to the user. Additionally or alternatively, the impact data manager 5 may find one or more anomalies, may determine one or more possible corrections or adjustments to resolve the one or more anomalies, and may request user input prior to proceeding with applying the possible corrections or any other corrections that are subsequently indicated by the user.

Figure 2H:
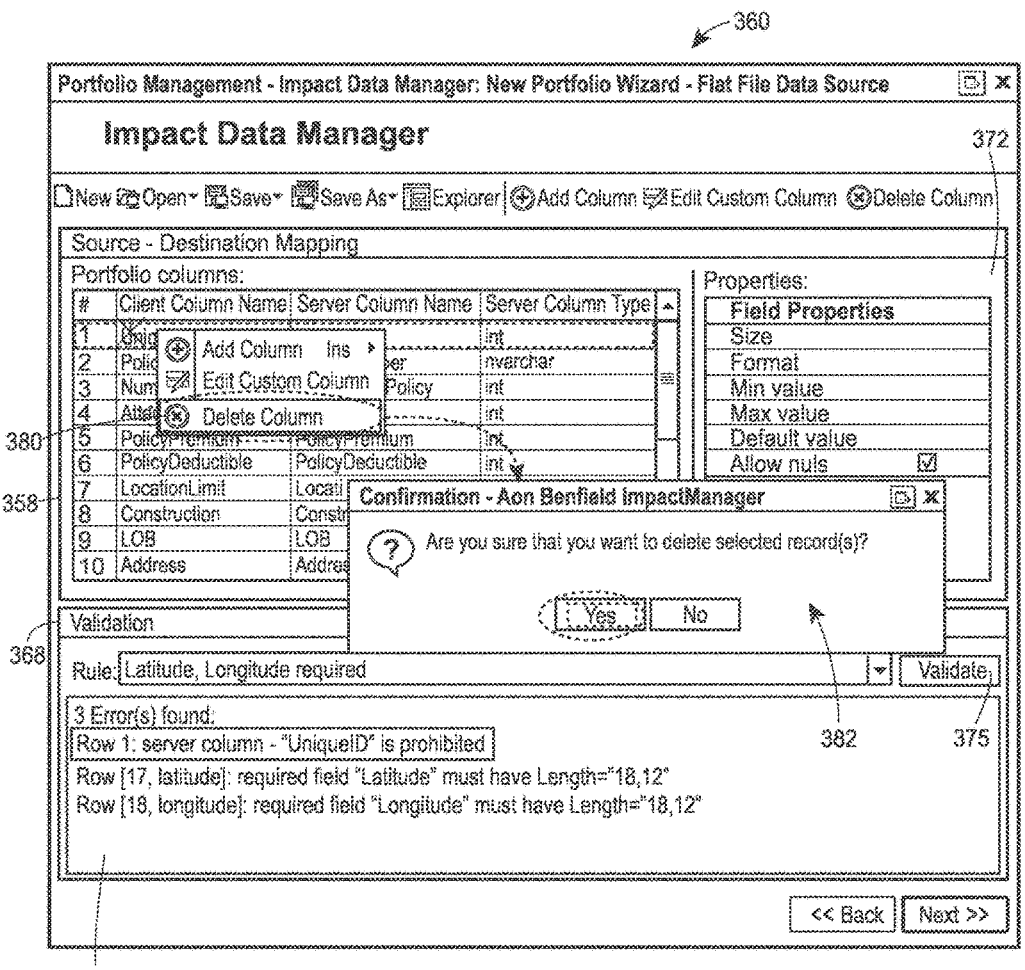

For example, FIG. 2H illustrates the screen 360 after the user has requested validation via the user control 375. A list of detected anomalies or errors 378 has been displayed in the second portion 368 of the screen 360. In the embodiment of FIG. 2H, the user has selected the first error "Row 1: server column—"UniqueID is prohibited" that indicates a presence of a keyed field in the source data. The user has indicated via pop-up windows 380 and 382 that the field UniqueID is to be deleted. In other embodiments, rather than merely bringing the keyed field to the user's attention, the impact data manager 5 may automatically suggest the deletion of Row 1 based on the presence of the keyed field (e.g., via a pop-up window or other suitable user indication). Upon receiving approval from the user for the deletion of Row 1, the impact data manager 5 may proceed accordingly, thus correcting the first error in the data that is to be delivered to the mapping system 10.

Figure 2I:
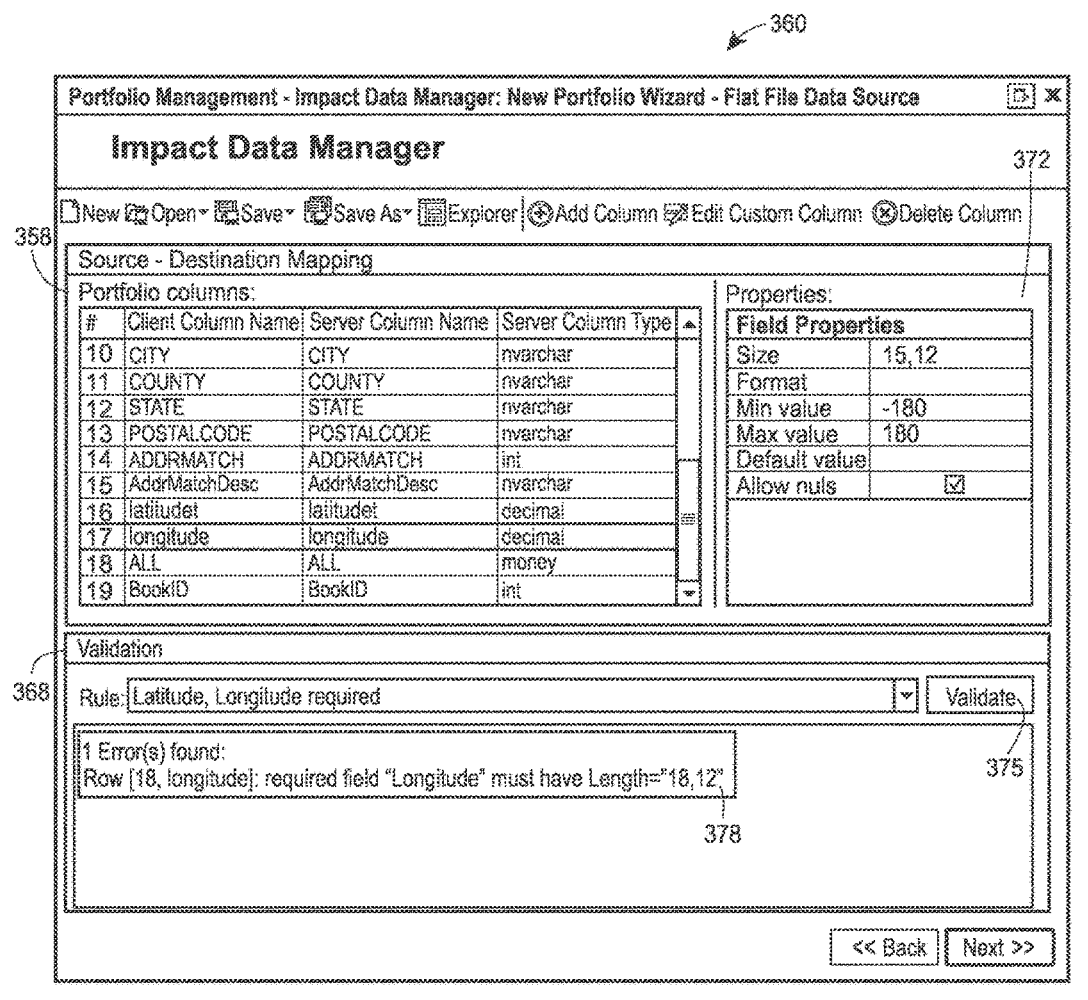

Continuing on with anomaly correction, FIG. 2I illustrates the latitude/longitude data field errors in the list 378 being corrected. In the scenario shown in FIG. 2I, the user has selected the error "Row [18, longitude]: required field "Longitude" must have Length='18, 12'" in the list 378 that indicates the lengths of the data field "Longitude" must be of length 18. To correct the error, the user has selected the "Longitude" row in the first portion 358 of the screen 360 to bring up the corresponding properties in the third portion 372 of the screen 360. The user has selected the "Size" property corresponding to the Longitude row to change the values of the "Size" property from "15, 12" to "18, 12." In other embodiments, rather than the user selecting various fields to effect the appropriate corrective action, the impact data manager 5 may automatically suggest the appropriate correction, e.g., via a pop-up window or other suitable user notification. Upon receiving approval from the user for the correction, the impact data manager 5 may proceed accordingly, thus correcting the errors in the data that is to be delivered to the mapping system 10.

FIG. 2J illustrates an embodiment of a validation of a data type. In this example, the user is validating, via the first portion 358 of the screen 360, the data type or units of the PolicyPremium data field that is to be sent to the mapping system 10. The user has invoked a drop-down menu 390 and is changing the data type of the Policy Premium data field from "int" to "money." In other embodiments, rather than the user determining an appropriate data type change, the impact data manager 5 may automatically suggest that one or more data types 362c be changed, e.g., via a pop-up window or other suitable user notification. Upon receiving approval from the user for the changing of the one or more data types, the impact data manager 5 may proceed accordingly, thus validating the data types included in the converted source data that is to be delivered to the mapping system 10.

The user may continue with manually correcting errors or anomalies detected during the validation process, and/or accepting corrections or adjustments suggested by the impact data manager 5. For example, the user may activate the "Validate" user control 375 to determine if any anomalies are outstanding, and the user make take steps to correct or resolve any outstanding errors or anomalies. After all anomalies have been corrected or resolved, the impact data manager 5 may indicate as such 392 on the screen 360, as shown in FIG. 2K. The converted, validated source data may now be in a format that is compatible with the mapping system 10. The user may activate the "Next" user control 395 to provide identification of the portfolio to be stored at the mapping system 10.

FIG. 2L depicts a screen 400 via which the user may provide identification of the portfolio that is to contain the converted, validated source data and that is to be stored at the mapping system 10. The user may indicate, for example, a portfolio identification or name 402, a date of creation or modification 405, a description 408, an indication of the original source data file 410, and an indication of whether or not to overwrite an existing portfolio 412 at the mapping system 10. The user may indicate a type of peril 415 corresponding to the portfolio via a user interface control, such as via a drop-down menu or other user interface.

Via the screen 400 or via a previous screen (e.g., the validation screen 360), the user may request to validate control totals 418. Control totals may include a verification of a summation or other combination of values, e.g., a maximum exposure for a portfolio, a maximum policy premium when a portfolio includes multiple locations, a maximum number of people, and the like. In some examples, control totals may include a tally of values by a particular data field (e.g., column type or name). In this manner, the data may be filtered by a data column and values combined for all rows having a matching value for the selected data field. In a particular example, the data field is geographic region, and control totals include a control total for geographic region A, a control total for geographic region B, etc., up to a control total for geographic region N. The geographic region, in some examples, may identify a state, province, county, city, or country. In an embodiment, one or more control totals may be presented on the user interface 15 for user assessment, and the user may take actions to modify the source data (either original, converted or both) if the user deems necessary. In an embodiment, the impact data manager 5 may automatically determine one or more possible anomalies associated with one or more control totals (e.g., based on the rules 28a and/or the properties 372 of the control totals), determine one or more possible corrections or adjustments to resolve the one or more anomalies, and request user input prior to proceeding with applying the possible corrections or other corrections indicated by the user. In some embodiments, control total validation 418 may be performed at the impact data manager 5. In some embodiments, control total validation 418 may be performed at the mapping system 10. For example, the impact data manager 5 may deliver the source data to the mapping system 10 for control total validation, the mapping system 10 may perform control total validation 418 and return control totals to the impact data manager 5 for a user to accept or decline.

After the portfolio has been identified and any desired control totals are validated, the user may activate the "Next" user control 420 to schedule delivery of the converted, validated source data to be stored at the mapping system 10 under the named portfolio.

The user may indicate that the named portfolio (including the converted, validated source data) be immediately delivered to the mapping system 10, e.g., for publication, or the user may schedule the named portfolio to be delivered to the mapping system 10. In an embodiment, prior to delivery, the named portfolio may be encrypted and/or the named portfolio may be compressed. The named portfolio may be delivered to the mapping system 10, and, in real-time, the mapping system 10 may respond to the impact data manager 5 with an acknowledgement of a successful delivery and storage. The impact data manager 5 may provide an indication of the successful delivery at the user interface 15.

As the example scenarios of FIGS. 2A-2L illustrate, the impact data manager 5 may be configured to operate on one or more sets of potentially disparate source data formats, map the one or more sets into a format that is compatible with the back-end mapping system 10, and deliver the compatible source data to the mapping system 10 to be stored as a portfolio. For example, the impact data manager 5 may be configured to perform one or more types of client or front-end validation on the original source data, on the converted source data, or on both the original and the converted source data. The validation may include numerical validation, content validation within or across data fields (e.g., geographic location validation), data field format validation, control total validation, and/or other types of validation. Further, the impact data manager 5 may provide anomaly or error detection and/or anomaly or error correction that may range from manual to fully automatic. As such, with the impact data manager 5 at the front-end, the mapping system 10 at the back-end may be inoculated from being infected by any anomalies in the source data, and may be able to perform mapping functions and respond to client requests more efficiently.

Figure 3:
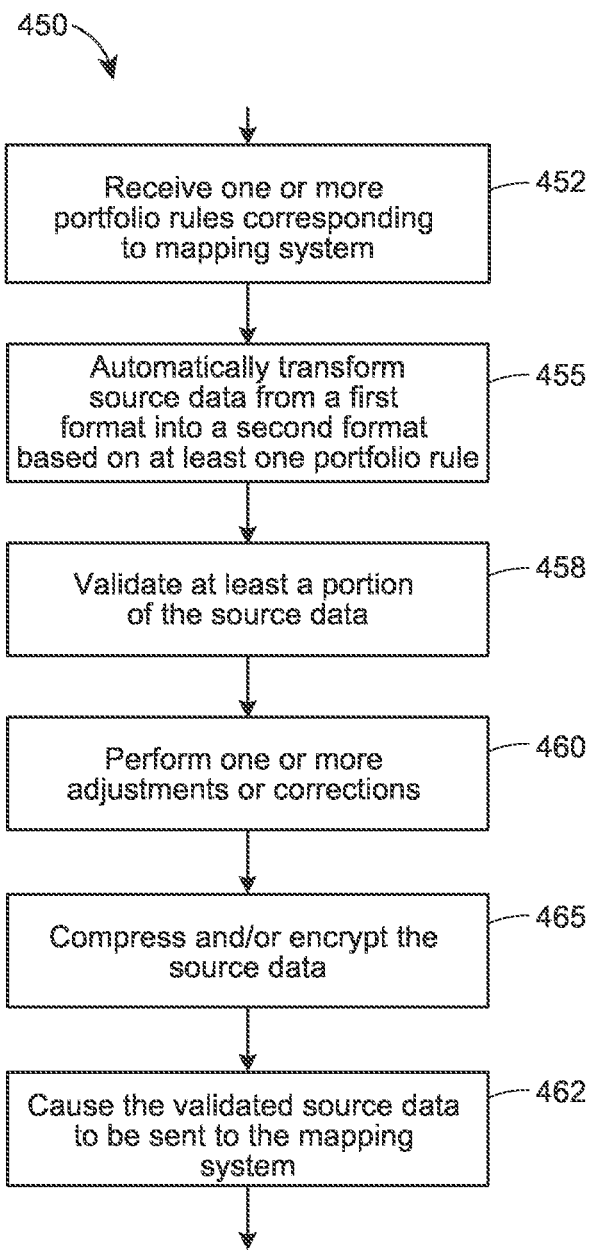
FIG. 3 is an example method for delivering source data to a mapping or impact-on-demand system.

FIG. 3 is an example method 450 for delivering source data to a mapping or impact-on-demand system. Although the method 450 is described in conjunction with the impact data manager system 5 and the mapping system 10 of FIG. 1, the method 450 may operate in conjunction with other suitable systems. Some or all portions of the method 450 may operate in conjunction with by any or all of the screens discussed with respect to FIGS. 2A-2L.

The method 450 may include receiving one or more portfolio rules corresponding to a mapping system 452. For example, an impact data manager 5 or a dynamic data delivery module 12 included in the impact data manager 5 may receive one or more portfolio rules, mapping rules or mapping system rules 28a via a communications link 18a, 18b from a mapping system 10. The one or more portfolio rules 28a may indicate a data format that is understood by and compatible with the mapping system 10, e.g., a set of characteristics, limits, and/or boundary conditions of various data fields and contents of the various data fields. As such, the one or more portfolio rules may define data compatibility with the mapping system 10.

At a block 455, source data to be delivered to the mapping system 10 may be automatically transformed or converted from a first or original format into a second or target format. Source data may include data that is provided to the mapping system 10 for generating output. Mapping system output may include, for example, maps, reports, risk management assessments, and the like. Source data may include one or more indications of a geographical location. In an embodiment, at least some of the source data may correspond to one or more properties, e.g., to one or more insured real properties or other types of properties. The second format may be at least partially defined or bounded by at least one of the one or more portfolio rules. In an embodiment, the transformation may be at least partially based on user input, such as when a user selects a subset of the source data to be transformed or when the user indicates a priority order of rule application. In an embodiment, the source data may be automatically transformed 455 by the dynamic data delivery module 12 of the impact data manager 5. For example, one or more data field properties such as size, length, format, etc. may be automatically transformed by the dynamic data delivery module 12, a data type of a data field (e.g., num, char, int, money, etc.) may be automatically transformed or changed, or one or more rows or columns of the original source data may be added or deleted.

At a block 458, at least a portion of the source data may be validated. In an embodiment, the dynamic data delivery module 12 may perform a validation of at least a portion of the source data in the first format, at least a portion of the source data in the second format, or both. The validation may be performed based on at least one of the portfolio rules and/or based on at least one other rule. In an embodiment, a user may indicate a rule (in addition to those included in the at least one of the portfolio rules) that is to be used in the validation process. The validation may include, for example, a numerical value validation, a control total validation, a geographical location validation, a cross-check validation between different data cells and/or data fields, a data field property validation, a data field type validation, or any other desired validation. In an embodiment, the types of validation to be performed 458 may be at least partially selected by a user.

At a block 460, if the presence of an anomaly or error is discovered or determined, a correction or adjustment to the source data may be applied or performed. In an embodiment, the dynamic data delivery module 12 may discover an anomaly or error based on at least one of the portfolio rules and/or based on at least one other rule, and the dynamic data delivery module 12 may automatically make a correction or apply an adjustment 460 to the source data based on the anomaly or error. For example, one or more data field properties such as size, length, format, etc. may be automatically adjusted or changed to be compatible with the second format. A data type of a data field (e.g., num, char, int, money, etc.) may be automatically adjusted to be compatible with the second format. One or more rows or columns of the original source data may be added or deleted.

In some embodiments, a correction or adjustment may be performed only after user approval for the correction or adjustment is received. A correction or adjustment may be made to the source data in the first format, to the source data in the second format, or to both. In an embodiment, multiple corrections or adjustments may be made, either simultaneously or sequentially.

In some embodiments, the blocks 458-460 may be iteratively executed until no more anomalies or errors are detected. In some embodiments, the block 455 may be executed in conjunction with at least one iterative execution of the blocks 458-460, such as when additional source data in the first format is required to be added in order to correct a detected anomaly.

At a block 462, the validated, transformed source data may be caused to be delivered to the mapping system 10. In an embodiment, the dynamic data delivery module 12 may cause the validated, transformed source data to be delivered from the impact data manager system 5 to the mapping system 10 via the links 18a, 18b to be stored at the mapping system 10 as a portfolio. In some embodiments, the validated, transformed source data may be encrypted, compressed, or both encrypted and compressed 465 prior to being caused to be delivered 462 to the mapping system 10.

Figure 4:
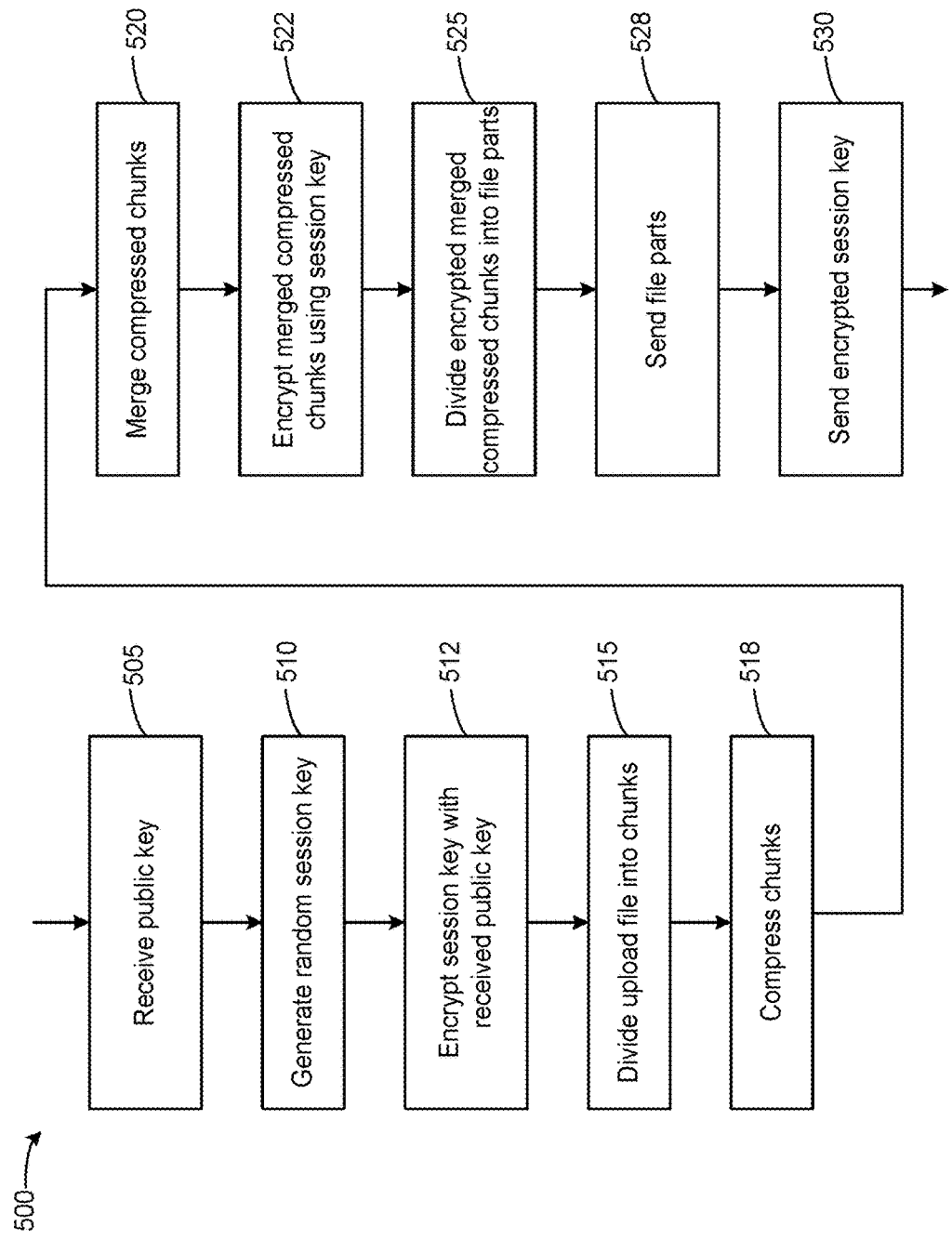
FIG. 4 is an example method for securely delivering source data to a destination system.

In some embodiments, a process 500, illustrated in FIG. 4, may be used to encrypt and/or compress data between two systems (for example, the impact data manager 5 and the mapping system 10) to ensure secure data transfer.

To enable the secure data transfer process illustrated in FIG. 4, the destination system (mapping system 10, for example) may generate and store a public/private key pair (public key and private key) to enable a client system (impact data manager 5, for example) to send data securely. The key pair may be associated with a public key cryptosystem that may be used to encrypt and decrypt information. Public key cryptosystems are well known in the art of cryptography. In a public key cryptosystem, such as RSA, ElGamal, ECC (Elliptic Curve Cryptography) and the like, a key pair may be generated—a public key and a private key—where the public key may be distributed publicly and used to encrypt data and the private key may be held in secret and used to decrypt the data. Using one of the well-established public key cryptosystems with sufficiently long keys may ensure that a particular private key may not be computed from the associated public key. The stored private key may be kept secret within mapping system 10. The key length for a cryptosystem may establish a level of security of the system. For the RSA public key cryptosystem, for example, a minimum key length of 1024 bits may be used. For additional security, a key length of 2048 bits or even 4096 bits may be used.

At a block 505, in some implementations, before starting a new upload, a public key is received. The impact data manager 5, for example, may receive the public key from the mapping system 10 by a secure web service (via HTTPS, for example). In another example, the mapping system 10 may receive the public key from a remote client. The use of a secure web service to transport the public key may reduce the possibility of a so-called "man-in-the-middle" attack, where an attacker may secretly relay and/or alter the communication between two parties.

At a block 510, in some implementations, a random session key is generated. For example, the impact data manager 5 may generate a random and cryptographically strong session key. In another example, the remote client may generate the session key. A new session key may be generated for each new upload. The session key may be kept secret and used only internally within impact data manager 5 or remote client. The session key may also be sent securely (using a public key cryptosystem, for example) to the recipient system (e.g., the mapping system 10 from the impact data manager 5). The session key may be associated with a symmetric-key cryptosystem where the same cryptographic key is used for both encryption and decryption. Symmetric-key cryptosystems include, but are not limited to, the Data Encryption Standard (DES), the Advanced Encryption Standard (AES)/Rijndael, Twofish, Blowfish, Serpent, CAST-128, Kuznyechik, RC4, 3DES, Skipjack, Safer+/++, International Data Encryption Algorithm (IDEA), and the like. For the AES/Rijndael symmetric-key cryptosystem, a key length of 256 bits may be used to ensure a high level of security.

In some implementations, at a block 512, the session key is encrypted with the public key. For example, the impact data manager 5 may encrypt the session key with the public key received from mapping system 10 in block 505. The session key may be encrypted using a secure public key encryption system, such as RSA, ElGamal, ECC and the like.

At a block 515, in some implementations, the upload file is divided into chunks. For example, the impact data manager 5 may divide a file containing validated, transformed source data into a number of chunks. In another example, a remote client may divide source data into a number of chunks. Each chunk may be the same predetermined number of bits, or each chunk may be a different number of bits. In some examples, each chunk may include 500 kilobytes, 1 megabyte, or 2 megabytes, The choice of the size of the chunks may depend on the structure and number of the source data files.

At a block 518, in some implementations, each chunk is compressed. For example, the impact data manager 5 may compress each chunk to reduce the size of each chunk. The compression may use any lossless data compression algorithm, such as Lempel-Ziv (LZ), Lempel-Ziv-Welch (LZW), Lempel-Ziv-Renau (LZR) (also known as Zip), Sequitur, Huffman coding, and the like.

In some implementations, at a block 520, the compressed chunks are merged. For example, impact data manager 5 may merge all of the compressed chunks into a single assembled file. The assembled file may include a concatenated sequence of records, with each record containing a compressed chunk preceded by an offset indicating the location of the start of the next record.

At a block 522, in some implementations, the merged, compressed chunks are encrypted using the session key. For example, the impact data manager 5 may encrypt the assembled file with a selected symmetric-key cryptosystem (AES, for example) using the session key generated in block 510.

At a block 525, in some implementations, the encrypted, merged, and compressed chunks may be divided into file parts. For example, the impact data manager 5 may divide the encrypted assembled file into a number of file parts. In an example, the choice of the number of file parts may depend upon the speed and/or type of connection between the sending and receiving systems. In one example, based upon historic transfer speeds, the number of file parts (e.g., size of each file part) may be adjusted. The size of each file part may range from a minimum packet size for effecting transfer to a maximum file part length. The maximum file part length, for example, may be configured in some embodiments by the sender or the receiver.

At a block 528, in some implementations, the file parts are provided to the remote receiving system. For example, the impact data manager 5 may send each file part to mapping system 10. Local sending system (e.g., remote client or impact data manager 5) may use a secure data transport protocol, such as Transport Layer Security (TLS) or Secure Sockets Layer (SSL), to securely transfer the file parts to mapping system 10.

In some implementations, at a block 530, the encrypted session key is provided to the remote system. For example, the impact data manager 5 may send the encrypted session key to mapping system 10.

Figure 5:
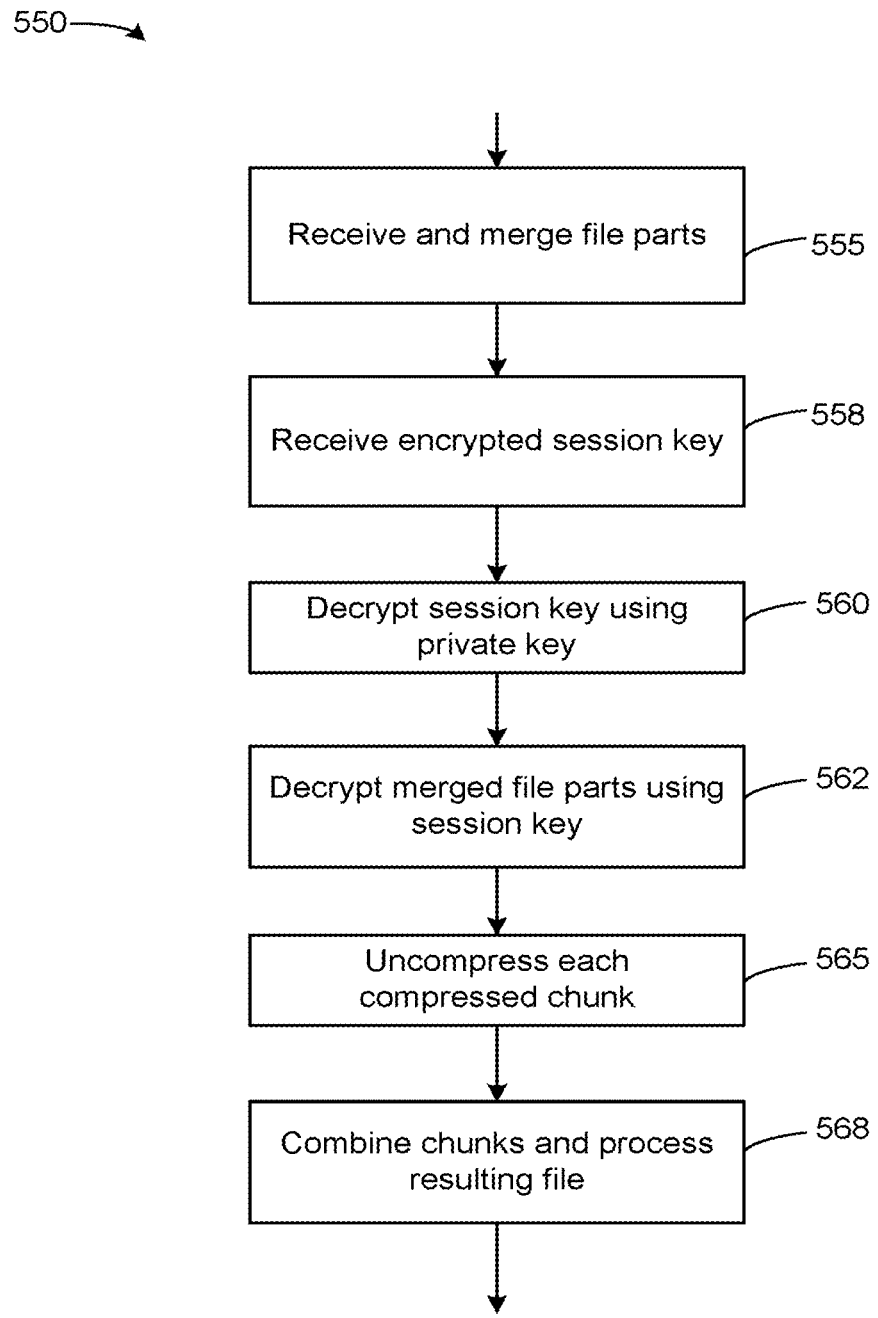
FIG. 5 is an example method for use by a destination system to receive and process secure source data.

In some embodiments, a process 550, illustrated in FIG. 5, may be used by a destination system (for example, the mapping system 10 or the impact data manager 5) to receive and process file parts from a client system (impact data manager 5 or a remote client system, for example).

In some implementations, at a block 555, file parts are received and merged. For example, the mapping system 10 may receive and merge the file parts from the impact data manager 5. The merged file parts may be stored by mapping system 10 on, for example, the mapping system data storage entity 20.

At a block 558, in some implementations, an encrypted session key is received. The mapping system 10, for example, may receive the encrypted session key from the impact data manager 5. In some implementations, the encrypted session key is stored by the receiver. For example, the mapping system 10 may store the encrypted session key in the mapping system data storage entity 20.

In some implementations, at a block 560, the session key is decrypted using the private key. The session key, for example, may be decrypted using the same public key encryption system as used by the sender (e.g., impact data manager 5 or the remote client) along with the private key.

In some implementations, at a block 562, the merged file parts are decrypted using the session key. For example, the mapping system 10 may decrypt the encrypted assembled file stored in, for example, the mapping system data storage entity 20 using the session key and the same symmetric-key cryptosystem as used to encrypt the assembled file in block 522 of FIG. 4.

In some implementations, at a block 565, each compressed chunk is uncompressed. For example, the mapping system 10 may uncompress each compressed chunk in the decrypted assembled file using a decompression algorithm associated with the compression algorithm used in step 518 of FIG. 4.

At a block 568, in some implementations, the chunks are combined into a data file. For example, mapping system 10 may combine the uncompressed chunks. After combination, the data file may be processed. For example, the impact data manager 5 may validate and/or transform a file of source data supplied by a remote client. In another example, the mapping system 10 may process the resulting file of validated, transformed source data.

The process described in FIGS. 4 and 5 provides for improved (safe and secure) uploading, since each part is transferred independently. Eavesdroppers using, for example, network sniffers won't be able to apprehend the intercepted data. The process also improves the operation of the system by making it possible to safely exchange session keys between remote systems, such as the impact data manager 5 and the mapping system 10.

Figure 6:
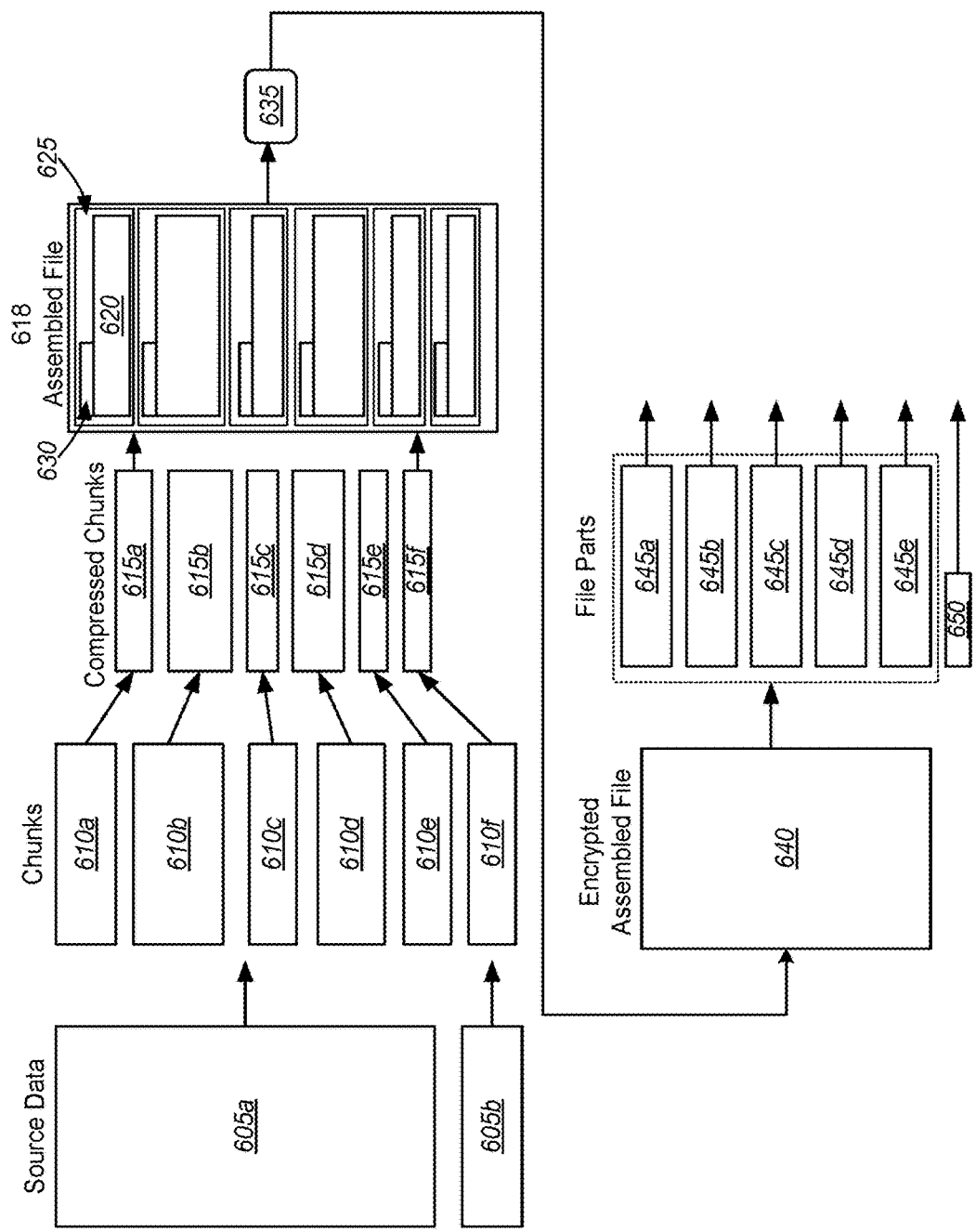
FIG. 6 is a schematic showing example file processing used to encrypt and/or compress data.

Although described in a particular order of operations, in other embodiments, the methods performed by the processes of FIGS. 4 and 6 may include a different order of operations. Additionally, one or more operations, in some embodiments, may be performed in parallel. For example, in some embodiments, rather than dividing out all of the file parts prior to transmission (block 525), file parts may be divided off during transmission of other file parts. In a particular illustration, a next-to-be-queued file part length may be determined based in part upon the transmission time of the most recently transmitted file part. For example, the method may involve maintaining at least one in process (transmitting) file part and one queued file part until the final file part remains. When the queued file part begins transmitting, the next file part is sized based upon the transmission time of the most recently completed file part transmission in view of the size of the most recently completed file part transmission. The next file part is then divided off and queued for transmission.

FIG. 6 illustrates a schematic diagram of an example implementation of the process shown in the FIG. 5. Source data files 605*a* and 605*b* may be divided, for example, into chunks 610*a*-610*f*. Each chunk 610*a*-610*f* may then be compressed, as described above, into compressed chunks 615*a*-615*f*. The compressed chunks 615*a*-615*f* may then be merged into assembled file 618. As noted above, the assembled file 618 may include a concatenated sequence of records 625, with each record containing a compressed chunk 620 preceded by an offset 630 indicating the location of the start of the next record.

Assembled file 618 may then be encrypted 635, as described above, for example with a selected symmetric-key cryptosystem using a session key, resulting in encrypted assembled file 640. Encrypted assembled file 640 may then be divided into a number of file parts 645*a*-645*e*. Each of the of file parts 645*a*-645*e* may then be sent to the destination system. Finally, encrypted session key 650 may be sent to the destination system to allow the destination system to decrypt the file parts 645*a*-645*e*.

In the example shown in FIG. 6, and described above, the number of source data files, number of chunks, and the number of file parts shown is not intended to be limiting. Any number of source data files, chunks, and file parts may be used.

Figure 9A:
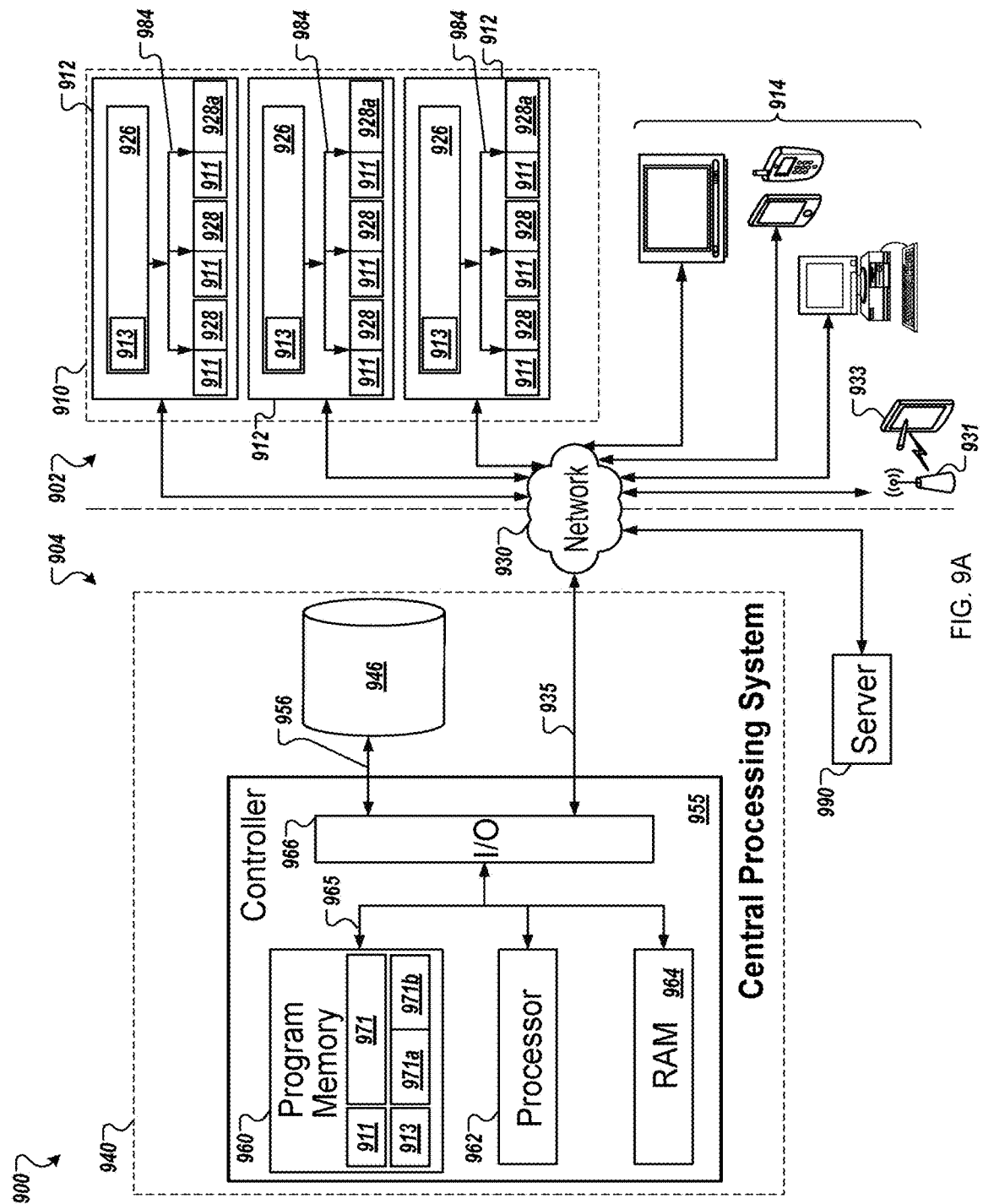
FIGS. 9A-9D each illustrates various aspects of an exemplary architecture implementing an impact data manager and/or an impact-on-demand or mapping system including source data delivery.
Figure 9B:
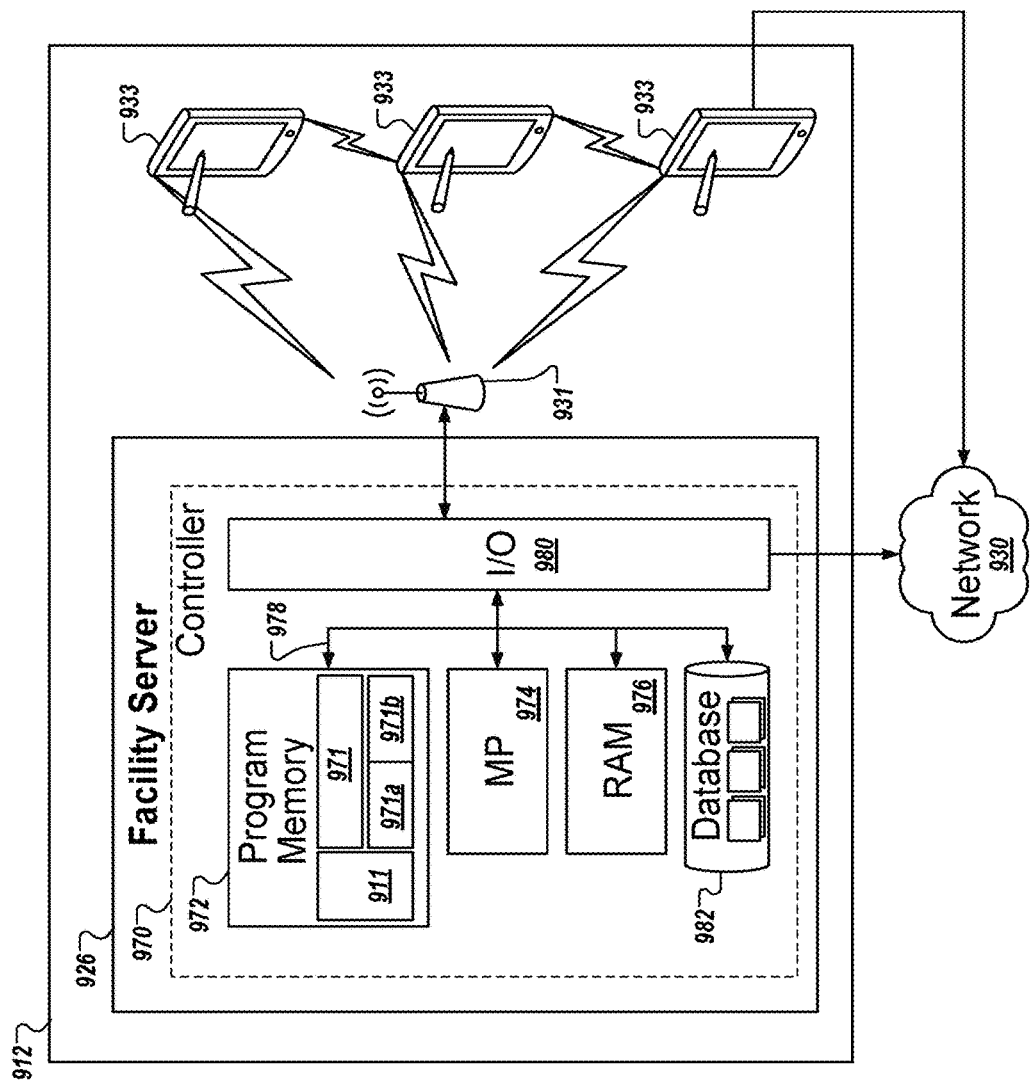

FIGS. 9A and 9B illustrate various aspects of an exemplary architecture for an impact-on-demand platform 900 that may support one or more systems, methods, user interfaces and other techniques described herein. For example, the impact-on-demand platform 900 may include the impact data manager 5 and the impact-on-demand or mapping system 10 of FIG. 1, in an embodiment. The impact-on-demand platform 900 may support the method 450 of FIG. 3, in an embodiment.

The impact-on-demand platform 900 may include both hardware and software applications, as well as various data communications channels for communicating data between the various hardware and software components. The impact-on-demand platform 900 may be roughly divided into front-end components 902 and back-end components 904. The front-end components 902 may primarily (but not necessarily) be disposed within a client network 910 including one or more clients computing devices 912. The client devices 912 may be located, by way of example rather than limitation, in separate geographic locations from each other, including different areas of the same city, different cities, or even different states. The front-end components 902 may additionally comprise a number of workstations 928. The workstations 928 may be local computers or computing devices located in the various locations 912 throughout the network 910 and executing various impact-on-demand/impact data manager applications. In an embodiment, each workstation and local computing device 928 may include an instance of an impact data manager, such as the impact data manager 5 discussed with respect to FIG. 1.

Web-enabled devices 914 (e.g., personal computers, tablets, cellular phones, smart phones, web-enabled televisions, etc.) may be communicatively connected to locations 912 and to the system 940 through a digital network 930 or a wireless router 931. In an embodiment, a web-enabled device 914 may include the user interface 15 of FIG. 1. In an embodiment, the digital network 930 may be the network 25 of FIG. 1.

Returning now to FIG. 9A, those of ordinary skill in the art will recognize that the front-end components 902 may also comprise a plurality of facility servers 926 disposed at the plurality of locations 912 instead of, or in addition to, a plurality of workstations 928, in an embodiment. Each of the locations 912 may include one or more facility servers 926 that may facilitate communications between the web-enabled devices 914 and the back-end components 904 via the digital network 930, described below, and between the workstation 928 and client device terminal 928A of the locations 912 via the digital network 930, and may store information for a plurality of customers/employees/accounts/etc. associated with each facility 912. In an embodiment, each server 926 may include an instance of an impact data manager, such as the impact data manager 5 discussed with respect to FIG. 1.

Of course, a local digital network 984 may also operatively connect each of the workstations 928 to the facility server 926. Unless otherwise indicated, any discussion of the workstations 928 also refers to the facility servers 926, and vice versa. Moreover, environments other than the locations 912, such as the kiosks, call centers, and Internet interface terminals may employ the workstations 928, the web-enabled devices 914, and the servers 926. As used herein, the term "location" refers to any of these points of contact (e.g., call centers, kiosks, Internet interface terminals, etc.) in addition to the locations 912, etc. described above.

The front-end components 902 may communicate with the back-end components 904 via the digital network 930. In embodiment, the digital network 930 may be the network 25 of FIG. 1. One or more of the front-end components 902 may be excluded from communication with the back-end components 904 by configuration or by limiting access due to security concerns. For example, the web-enabled devices 914 may be excluded from direct access to the back-end components 904. In some embodiments, the locations 912 may communicate with the back-end components via the digital network 930. In other embodiments, the locations 912 and web-enabled devices 914 may communicate with the back-end components 904 via the same digital network 930, but digital access rights, IP masking, and other network configurations may deny access of the web-enabled devices 914. The web-enabled devices may also connect to the digital network 930 via the encrypted, wireless router 931.

The digital network 930 may be a proprietary network, a secure public Internet, a virtual private network or some other type of network, such as dedicated access lines, plain ordinary telephone lines, satellite links, combinations of these, etc. Where the digital network 930 comprises the Internet, data communication may take place over the digital network 930 via an Internet communication protocol. In addition to one or more web servers 990 (described below), the back-end components 904 may include a central processing system 940 within a central processing facility. In an embodiment, the central processing system 940 may include the mapping system 10 of FIG. 1. Of course, the locations 912 may be communicatively connected to different back-end components 904 having one or more functions or capabilities that are similar to the central processing system 940 (e.g., a processing system 941, 942, not shown). The central processing system 940 may include one or more computer processors 962 adapted and configured to execute various software applications and components of the mapping system 10.

The central processing system 940 may include a database 946. The database 946 may be adapted to store data related to the operation of the impact-on-demand platform 900, such as client portfolios, business intelligence cubes, mapping rules 28b and the like. In an embodiment, the database 946 may be the mapping system data storage entity 20 of FIG. 1. The central processing system 940 may access data stored in the database 946 when executing various functions and tasks associated with the operation of the system 900.

Although the impact-on-demand platform 900 is shown to include a central processing system 940 in communication with three locations 912 and various web-enabled devices 914 it should be understood that different numbers of processing systems, locations, and devices may be utilized. For example, the digital network 930 (or other digital networks, not shown) may interconnect the system 900 to a plurality of included central processing systems 940, hundreds of locations 912, and thousands of web-enabled devices 914. According to the disclosed example, this configuration may provide several advantages, such as, for example, enabling near real-time uploads and downloads of information as well as periodic uploads and downloads of information. This provides for a primary backup of all the information generated in the wireless customer data transfer process. Alternatively, some of the locations 912 may store data locally on the facility server 926 and/or the workstations 928.

FIG. 9A also depicts a possible embodiment of the central processing system 940. The central processing system 940 may have a controller 955 operatively connected to the database 946 via a link 956 connected to an input/output (I/O) circuit 966. It should be noted that, while not shown, additional databases may be linked to the controller 955 in a known manner.

The controller 955 may include a non-transitory, tangible program memory 960, the processor 962 (may be called a microcontroller or a microprocessor), a non-transitory, tangible random-access memory (RAM) 964, and the input/output (I/O) circuit 966, all of which may be interconnected via an address/data bus 965. It should be appreciated that although only one microprocessor 962 is shown, the controller 955 may include multiple microprocessors 962. Similarly, the memory of the controller 955 may include multiple RAMS 964 and multiple program memories 960. Although the I/O circuit 966 is shown as a single block, it should be appreciated that the I/O circuit 966 may include a number of different types of I/O circuits. The RAM(s) 964 and the program memories 960 may be implemented as semiconductor memories, magnetically readable memories, and/or optically readable memories, for example. A link 935 may operatively connect the controller 955 to the digital network 930 through the I/O circuit 966.

FIG. 9B depicts a possible embodiment of the front-end components 902 located in one or more of the client locations 912 from FIG. 9A. Although the following description addresses the design of the locations 912, it should be understood that the design of one or more of the locations 912 may be different from the design of others of the locations 912. Also, each of the locations 912 may have various different structures and methods of operation. It should also be understood that while the embodiment shown in FIG. 9B illustrates some of the components and data connections that may be present in a location 912, it does not illustrate all of the data connections that may be present in a location 912. For exemplary purposes, one design of a location is described below, but it should be understood that numerous other designs may be utilized.

Each of the locations 912 may have one or more tablets or user computing devices 933 and/or a facility server 926. The digital network 930 and wireless router 931 may operatively connect the facility server 926 to the plurality of user devices 933 and/or to other web-enabled devices 914 and workstations 928. The digital network 930 may be a wide area network (WAN), a local area network (LAN), or any other type of digital network readily known to those persons skilled in the art. The digital network 930 may operatively connect the facility server 926, the health tablets 933, the workstations 928, and/or the other web-enabled devices 914 to the central processing system 940.

Each tablet 933, workstation 928, client device terminal 928A, or facility server 926 may include a controller 970. Similar to the controller 955 from FIG. 9A, the controller 970 may include a non-transitory, tangible program memory 972, a microcontroller or a microprocessor (MP) 974, a non-transitory, tangible random-access memory (RAM) 976, and an input/output (I/O) circuit 980, all of which are interconnected via an address/data bus 978. In some embodiments, the controller 970 may also include, or otherwise be communicatively connected to, a database 982. In an embodiment, the database 982 may be, for example, the data storage entity 30 of FIG. 1.

The database 982 may include data such as customer records, insurer information records, and rules (e.g., the mapping rules 28a described with respect to FIG. 1) and miscellaneous information. As discussed with reference to the controller 955, it should be appreciated that although FIG. 9B depicts only one microprocessor 974, the controller 970 may include multiple microprocessors 974. Similarly, the memory of the controller 970 may include multiple RAMs 976 and multiple program memories 972. Although the FIG. 9B depicts the I/O circuit 980 as a single block, the I/O circuit 980 may include a number of different types of I/O circuits. The controller 970 may implement the RAM(s) 976 and the program memories 972 as semiconductor memories, magnetically readable memories, and/or optically readable memories, for example.

Either or both of the program memories 960 (FIG. 9A) and 972 may also contain machine-readable instructions (i.e., software) 971, for execution within the processors 962 (FIG. 9A) and 974, respectively. The software 971 may perform the various tasks associated with operation of the location or locations, and may be a single module 971 or a plurality of modules 971A, 971B. While the software 971 is depicted in FIGS. 9A and 9B as including two modules, 971A and 971B, the software 971 may include any number of modules accomplishing tasks related to location operation. In an embodiment, the software 971 may include the computer-executable instructions of the dynamic data delivery module 12 of FIG. 1.

In addition to the controller 970, the tablets 933, the workstations 928 and the other web-enabled devices 914 may further include a user interface such as the user interface 15 of FIG. 1. In an embodiment, the user interface may include a display and a keyboard as well as a variety of other input/output devices (not shown) such as a scanner, printer, mouse, touch screen, track pad, track ball, isopoint, voice recognition system, digital camera, bar code scanner, RFID reader, bio-identifier, etc. A location employee may sign on and occupy each tablet 933, workstation 928 or client device terminal 928a to assist the employee in performing his or her duties. Employees may sign onto the tablet 933, workstation 928 or the client device terminal 928a using any available technique, such as entering a user name and password. If an employee signs on to the system using a tablet 933, the network 930 may communicate this information to the facility server 926, so that the controller 970 may identify which employees are signed onto the system 900 and which tablet 933, workstation 928 or client device terminal 928a the employee is signed onto.

Various software applications resident in the front-end components 902 and the back-end components 904 may implement functions related to location and mapping operations, and provide various user interface means to allow users to access the system 900. One or more of the front-end components 902 and/or the back-end components 904 may include a user-interface application 911 for allowing a user to input and view data associated with the system 900, and to interact with the impact-on-demand platform 900. The user-interface application 911 may, for example, be in communicative connection with the dynamic data delivery module 12, or may be a part of the dynamic data delivery module 12. In an embodiment, the user interface application 911 is a web browser client, and the facility server 926 or the central processing system 940 implements a server application 913 for providing data to the user interface application 911. However, the user interface application 911 may be any type of interface, including a proprietary interface, and may communicate with the facility server 926 or the central processing system 940 using any type of protocol including, but not limited to, file transfer protocol (FTP), telnet, 32 hypertext-transfer protocol (HTTP), etc. Moreover, some embodiments may include the user interface application 911 running on one of the web-enabled devices 914 (as when a patient is accessing the system), while other embodiments may include the user interface application 911 running on the tablet 933 in a location 912. The central processing system 940 and/or the facility server 926 may implement any known protocol compatible with the user interface application 911 running on the tablets 933, the workstations 928 and the web-enabled devices 914 and adapted to the purpose of receiving and providing the necessary information during the wireless data transfer process.

Figure 9C:
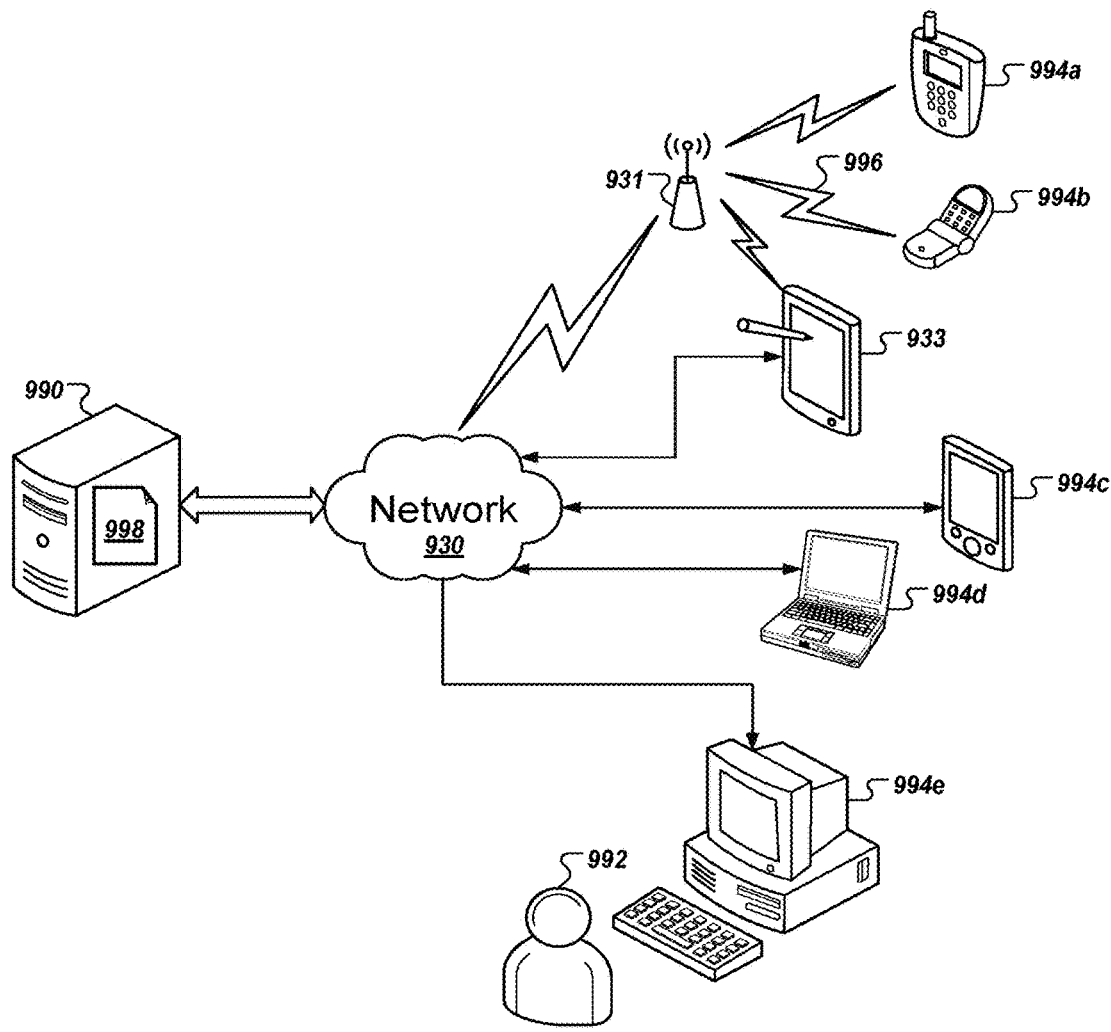

For purposes of implementing the impact-on-demand platform 900, the user may interact with location systems (e.g., the central processing system 940) via a plurality of web pages. FIG. 9C depicts a web server 990 connected via the digital network 930 to a plurality of tablets 933 and other web-enabled devices through which a user 992 may initiate and interact with the impact-on-demand platform 900. The web-enabled devices may include, by way of example, a smart phone or device 994a, a web-enabled cell phone 994b, a tablet computer 933, a personal digital assistant (PDA) 994c, a laptop computer 994d, a desktop computer 994e, a portable media player (not shown), etc. Of course, any web-enabled device appropriately configured may interact with the impact-on-demand platform 900. The web-enabled devices 933 and 994a-994e need not necessarily communicate with the digital network 930 via a wired connection. In some instances, the web-enabled devices 933 and 994a-994e may communicate with the digital network 930 via wireless signals 996 and, in some instances, may communicate with the digital network 930 via an intervening wireless or wired device 931, which may be a wireless router, a wireless repeater, a base transceiver station of a mobile telephony provider, etc. Each of the web-enabled devices 933 and 994a-994e may interact with the web server 990 to receive web pages, such as the web page 998 depicted in FIG. 9C, for display on a display associated with the web-enabled device 933 and 994a-994e. It will be appreciated that although only one web server 990 is depicted in FIG. 9C, multiple web servers 990 may be provided for the purpose of distributing server load, serving different web pages, implementing different portions of the location web interface, etc.

Figure 9D:
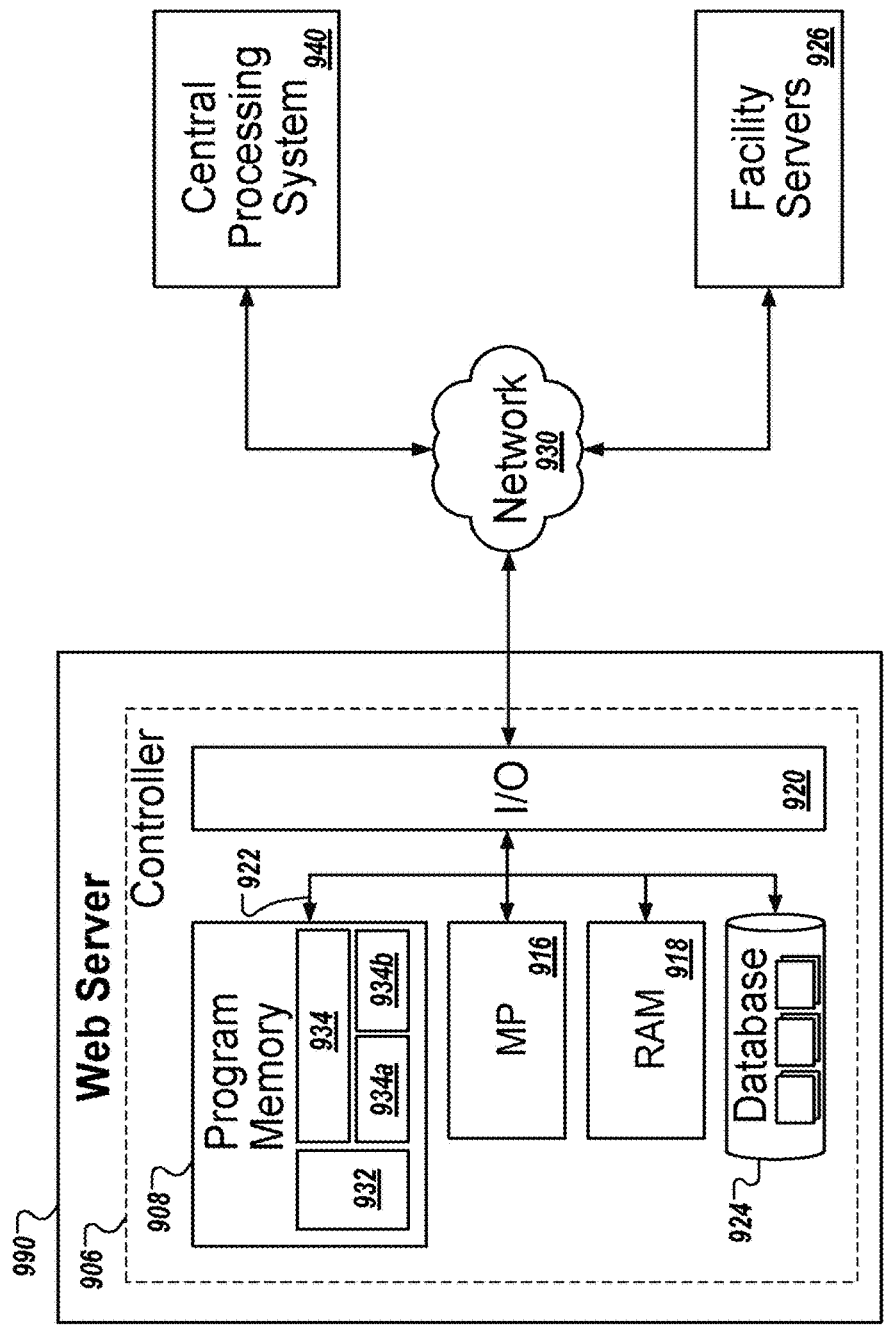

Turning now to FIG. 9D, the web server 990, like the facility server 926, may include a controller 906. Similar to the controllers 955 and 970, the controller 906 may include a non-transitory, tangible program memory 908, a microcontroller or a microprocessor (MP) 916, a non-transitory, tangible random-access memory (RAM) 918, and an input/output (I/O) circuit 920, all of which may be interconnected via an address/data bus 922. In some embodiments, the controller 906 may also include, or otherwise be communicatively connected to, a database 924 or other data storage mechanism (e.g., one or more hard disk drives, optical storage drives, solid state storage devices, etc.). The database 924 may include data such as customer web profiles, product data, web page templates and/or web pages, and other data necessary to interact with the user 992 through the digital network 930. As discussed with reference to the controllers 955 and it should be appreciated that although FIG. 9D depicts only one microprocessor 916, the controller 906 may include multiple microprocessors 916. Similarly, the memory of the controller 906 may include multiple non-transitory, tangible RAMs 918 and multiple non-transitory, tangible program memories 908. Although the FIG. 9D depicts the I/O circuit 920 as a single block, the I/O circuit 920 may include a number of different types of I/O circuits. The controller 906 may implement the RAM(s) 918 and the program memories 908 as semiconductor memories, magnetically readable memories, and/or optically readable memories, for example.

In addition to being connected through the digital network 930 to the user devices 933 and 994a-994e, as depicted in FIG. 9C, FIG. 9D illustrates that the web server 990 may also be connected through the digital network 930 to the central processing system 940 and/or one or more facility servers 926. As described below, connection to the central processing system 940 and/or to the one or more facility servers 926 facilitates the impact-on-demand platform 900.

The program memory 908 and/or the RAM 918 may store various applications for execution by the microprocessor 916. For example, an application 932 may provide a user interface to the server, which user interface may, for example, allow a network administrator to configure, troubleshoot, or test various aspects of the server's operation, or otherwise to access information thereon. A server application 934 may operate to populate and transmit web pages to the web-enabled devices 994a-994e, receive information from the user 992 transmitted back to the server 990, and forward appropriate data to the central processing system 940 and the facility servers 926, as described below. Like the software the server application 934 or a plurality of server application modules 934a, 934b. In an embodiment, the server application 934 or the server application modules 934a, 934b may include at least a portion of the computer-executable instructions for the dynamic data delivery module 12 of FIG. 1.

While the server application 934 is depicted in FIG. 9D as including two server application modules, 934a and 934b, the server application 934 may include any number of modules accomplishing tasks related to implementation of the web server 990. By way of example, the server application module 934a may populate and transmit the web pages and/or may receive and evaluate inputs from the user 992 to facilitate in the wireless transfer of data from a first tablet to a second tablet, while the server application module 934b may communicate with one or more of the back end components 904 to provide the requested data.

Typically, a user may launch or instantiate a user interface application (e.g., a web browser or other client application) from a web-enabled device, such as the web-enabled devices 933 and 994a-994e, to access the web server 990 cooperating with the system 940 to implement the impact-on-demand platform 900.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A non-transitory computer readable medium having instructions stored thereon, wherein the instructions, when executed by processing circuitry, cause the processing circuitry to:

receive a remote security token from a destination system via a network;
generate a local security token;
encrypt the local security token with the remote security token;
divide source data into a plurality of chunks;
compress each chunk of the plurality of chunks;
append each chunk of the plurality of chunks of the source data with an offset:
after compressing, merge the plurality of chunks into an assembled file comprising a concatenated sequence of records, wherein
each record includes a respective chunk of the plurality of chunks preceded by the offset, wherein the offset indicates a location of a start of a next record of the sequence of records:
encrypt the assembled file with the local security token;
after encrypting the assembled file, divide the assembled file into two or more parts,
wherein
a number of the two or more parts is adjustable based on attributes of the network connecting a transmitting system and the destination system;
transmit each of the two or more parts to the destination system via the network; and
transmit the encrypted local security token to the destination system via the network;
wherein, to access the source data, the destination system merges the two or more parts to obtain the encrypted, assembled file,
decrypts the encrypted local security token,
decrypts the encrypted, assembled file using the encrypted local security token,
divides the decrypted assembled file into the plurality of chunks, uncompresses each chunk of the plurality of chunks, and reassembles the uncompressed plurality of chunks into the source data.

2. The non-transitory computer readable medium of claim 1, wherein
the remote security token is a public key; and
encrypting the local security token with the remote security token comprises encrypting the local security token using a public key cryptosystem.

3. The non-transitory computer readable medium of claim 2, wherein the public key cryptosystem is RSA.

4. The non-transitory computer readable medium of claim 1, wherein
the local security token is a symmetric key; and
encrypting the assembled file comprises encrypting the assembled file using a symmetric-key cryptosystem.

5. The non-transitory computer readable medium of claim 1, wherein the plurality of chunks are compressed using a Lempel-Ziv-Renau algorithm.

6. The non-transitory computer readable medium of claim 1, wherein the assembled file comprises the concatenated sequence of records, wherein each record includes a location of a subsequent record and a compressed chunk of the plurality of chunks.

7. The non-transitory computer readable medium of claim 1, wherein the instructions, when executed by the processing circuitry, cause the processing circuitry to:
automatically transform, based on one or more rules corresponding to the destination system, any source data in a first format into a second format, the second format being compatible with the destination system; and
perform a validation of at least a portion of the source data in the first format or in the second format based on the one or more rules corresponding to the destination system.

8. The non-transitory computer readable medium of claim 1, wherein generating the local security token comprises generating a random session key.

9. The non-transitory computer readable medium of claim 1, wherein the attributes of the network comprise at least one of connection strength of the transmitting system, connection strength of the destination system, or historic transfer speeds.

10. The non-transitory computer readable medium of claim 1, wherein the number of the two or more parts is adjustable such that a data size of the two or more parts falls in a range between a minimum file part size and a maximum file part size.

11. A method for securely delivering source data to a destination system over a network comprising:
receiving, at a computing device via the network, a public key from the destination system;
generating, by processing circuitry of the computing device, a session key;
encrypting, by the processing circuitry, the session key with the public key using a public key cryptosystem to obtain an encrypted session key;
dividing, by the processing circuitry, the source data into a plurality of chunks;
compressing, by the processing circuitry, each chunk of the plurality of chunks;
after compressing, appending, by the processing circuitry, each chunk of the plurality of chunks of the source data with an offset;
merging, by the processing circuitry, all of the compressed chunks into a single file;
encrypting, by the processing circuitry, the single file with the session key using a second cryptosystem different than the public key cryptosystem;
after encrypting the single file, dividing, by the processing circuitry, the single file into two or more parts, wherein a number of the two or more parts is adjustable based on attributes of the network connecting a transmitting system and the destination system;
causing transmission of, by the processing circuitry, each of the two or more parts to the destination system via the network; and
causing transmission of, by the processing circuitry, the encrypted session key to the destination system via the network;
wherein, to access the source data, the destination system merges the two or more parts to obtain the encrypted, assembled file,
decrypts the encrypted local security token,
decrypts the encrypted, assembled file using the encrypted local security token,
divides the decrypted assembled file into the plurality of chunks,
uncompresses each chunk of the plurality of chunks, and reassembles the uncompressed plurality of chunks into the source data.

12. The method of claim 11, further comprising, prior to dividing the source data:
automatically transforming, by the processing circuitry based on one or more rules corresponding to the destination system, the source data from a first format into a second format, the second format being compatible with the destination system; and
performing, by the processing circuitry, a validation of at least a portion of the source data in the first format or in the second format based on the one or more rules corresponding to the destination system.

13. The method of claim 12, further comprising receiving, at the computing system from the destination system via the network, at least a portion of the one or more rules.

14. The method of claim 12, wherein automatically transforming the source data comprises automatically identifying a respective data type of each column of a plurality of column of data in the source data.

15. The method of claim 11, further comprising, prior to causing transmission of each of the two or more parts:
receiving, by the processing circuitry, an authentication token from a user of the computing device; and
verifying, by the processing circuitry with the destination system via the network, authorization of the user to transmit the source data to the destination system based on the authentication token.

16. The method of claim 11, wherein causing transmission of the two or more parts comprises causing transmission of the two or more parts, by a software application executing upon the computing device, using an Internet browser application.

17. The method of claim 16, further comprising enabling, by the processing circuitry within the Internet browser application, one or more secure transmission settings.

* * * * *